(12) United States Patent
Kadota

(10) Patent No.: US 7,831,969 B2
(45) Date of Patent: Nov. 9, 2010

(54) DRIVER INSTALLING SYSTEM FOR NETWORK DEVICES

(75) Inventor: Masatoshi Kadota, Takahama (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 967 days.

(21) Appl. No.: 10/638,341

(22) Filed: Aug. 12, 2003

(65) Prior Publication Data

US 2004/0034862 A1    Feb. 19, 2004

(30) Foreign Application Priority Data

| Aug. 13, 2002 | (JP) | ............................. 2002-235559 |
| Aug. 27, 2002 | (JP) | ............................. 2002-246708 |
| Nov. 21, 2002 | (JP) | ............................. 2002-337492 |

(51) Int. Cl.
G06F 9/445    (2006.01)
G06F 3/00     (2006.01)

(52) U.S. Cl. ........................ 717/178; 717/175; 717/176; 717/177; 719/327

(58) Field of Classification Search ................. 717/176, 717/177, 168, 178
See application file for complete search history.

(56) References Cited

U.S. PATENT DOCUMENTS

| 5,689,730 | A | 11/1997 | Wakasugi |
| 5,699,495 | A * | 12/1997 | Snipp ........................ 358/1.15 |
| 6,023,585 | A * | 2/2000 | Perlman et al. ............. 717/178 |
| 6,091,508 | A * | 7/2000 | Love et al. ................. 358/1.15 |
| 6,694,354 | B1 * | 2/2004 | Elg ............................. 709/217 |
| 6,915,514 | B1 | 7/2005 | Machida |
| 6,927,770 | B2 * | 8/2005 | Ording ........................ 345/440 |
| 6,976,252 | B2 * | 12/2005 | White et al. ................ 717/174 |
| 7,089,551 | B2 * | 8/2006 | Fordemwalt et al. ........ 717/174 |
| 7,107,330 | B1 * | 9/2006 | Hamilton et al. ............ 709/221 |
| 7,173,723 | B1 * | 2/2007 | Ando ........................ 358/1.15 |
| 7,529,920 | B2 * | 5/2009 | Hirai ............................. 713/1 |

(Continued)

FOREIGN PATENT DOCUMENTS

JP    A 06-139401    5/1994

(Continued)

OTHER PUBLICATIONS

"Microsoft Windows 2000 Administrator's Pocket Consultant," edited by William R. Stanek, published by Nikkei BP Soft Press, Inc. on Sep. 11, 2000; pp. 421-423.

*Primary Examiner*—Tuan Q Dam
*Assistant Examiner*—Isaac T Tecklu
(74) *Attorney, Agent, or Firm*—Oliff & Berridge, PLC

(57) ABSTRACT

A method of installing a device driver for a system including a multifunction device, a first terminal device and a second terminal device. The multifunction device is connected to the first terminal device. The first and second terminal devices are connected through a network. The first terminal device is installed with first and second device drivers respectively for first and second functions of the multifunction device. According to the method, when the second device is set to connect with the multifunction device through the first terminal device with respect to the first function, the first device driver is installed in the second terminal device with the second device driver installed as a part of the first device driver. When the first device driver installed in the second terminal device is initialized, and the second device driver is also initialized.

19 Claims, 22 Drawing Sheets

U.S. PATENT DOCUMENTS

| | | | |
|---|---|---|---|
| 2002/0054326 | A1 | 5/2002 | Morita |
| 2002/0147795 | A1* | 10/2002 | Cantwell .................... 709/220 |
| 2002/0147973 | A1* | 10/2002 | Fordemwalt et al. ........ 717/174 |
| 2002/0184304 | A1* | 12/2002 | Meade et al. ................ 709/203 |
| 2003/0037325 | A1* | 2/2003 | Hargrove et al. ............ 717/175 |
| 2003/0051011 | A1* | 3/2003 | Schacht et al. .............. 709/221 |
| 2003/0065755 | A1 | 4/2003 | Gunji |
| 2003/0066066 | A1* | 4/2003 | Nguyen et al. ............... 717/178 |
| 2003/0084132 | A1* | 5/2003 | Ohta .......................... 709/221 |
| 2003/0217192 | A1* | 11/2003 | White et al. ................ 709/321 |
| 2003/0225933 | A1* | 12/2003 | Suzuki ........................ 709/321 |
| 2004/0003135 | A1* | 1/2004 | Moore ......................... 709/321 |
| 2004/0128676 | A1* | 7/2004 | Wang et al. .................. 719/321 |
| 2005/0073726 | A1 | 4/2005 | Nobuta et al. |
| 2005/0210464 | A1 | 9/2005 | Machida |

FOREIGN PATENT DOCUMENTS

| | | |
|---|---|---|
| JP | A 7-64887 | 3/1995 |
| JP | A 8-186676 | 7/1996 |
| JP | A 08-195764 | 7/1996 |
| JP | A 8-317178 | 11/1996 |
| JP | A 08-320771 | 12/1996 |
| JP | A 9-185590 | 7/1997 |
| JP | A 09-214645 | 8/1997 |
| JP | A 10-124436 | 5/1998 |
| JP | A 11-122414 | 4/1999 |
| JP | A 11-205573 | 7/1999 |
| JP | A-11-259410 | 9/1999 |
| JP | A 2000-122853 | 4/2000 |
| JP | A 2000-353079 | 12/2000 |
| JP | A-2000-353079 | 12/2000 |
| JP | A 2001-067304 | 3/2001 |
| JP | A 2001-109692 | 4/2001 |
| JP | A 2001-117834 | 4/2001 |
| JP | A-2001-117834 | 4/2001 |
| JP | A 2001-312433 | 11/2001 |
| JP | A-2001-325170 | 11/2001 |
| JP | A-2001-337833 | 12/2001 |
| JP | A 2002-84383 | 3/2002 |
| JP | A-2002-132400 | 5/2002 |
| JP | A 2002-132400 | 5/2002 |

* cited by examiner

FIG.15

```
typedef struct _devicemode  {   / * dvmd * /
        BCHAR    dmDeviceName[32];
        WORD     dmSpecVersion;
        WORD     dmDriverVersion;
        WORD     dmSize;
        WORD     dmDriverExtra;
        DWORD    dmFields;
        short    dmOrientation;
        short    dmPaperSize;
        short    dmPaperLength;
        short    dmPaperWidth;
        short    dmScale;
        short    dmCopies;
        short    dmDefaultSource;
        short    dmPrintQuality;
        short    dmColor;
        short    dmDuplex;
                    :
                    :
        BCHAR   DeviceAddress[128];
} DEVMODE;
```

DRIVER INSTALLING SYSTEM FOR NETWORK DEVICES

BACKGROUND OF THE INVENTION

The present invention relates to a driver installing system for electronic devices connected to a network such as a LAN (Local Area Network).

Conventionally, a multifunction peripheral (hereinafter, referred to as an MFP) has been known. The MFP is a device having a plurality of functions such as a printer function, a scanner function and a facsimile function. Such an MFP may be connected to a terminal device, which is connected to a network such as the LAN, and used as a local device of the terminal device. Optionally, the MFP may be used as a network device which is used by a plurality of terminal devices, functioning as clients, which are connected to the network using a TCP/IP. In such a case, each client uses the MFP in accordance with a sharing function provided by an OS (operating system) installed in the terminal device (hereinafter, such a terminal device will be referred to as a server) to which the MFP is connected.

In order to enable the client connected to the network to use the MFP, necessary settings including the setting of the IP address thereof should be made in the MFP. In each client, driver software corresponding to respective functions of the MFP should be installed, and necessary settings including the setting of the IP address of the MFP should be done in each of the drivers corresponding to respective functions of the MFP.

Regarding the printer function and facsimile function, the operating system generally provides a sharing function so that the installation of the driver software in each client computer is facilitated.

The sharing function is a function with which, under a network circumstance, a file in one of the clients or a server and/or a peripheral device such as a printer is made usable by another client connected to the same network. The shared function is a basic function provided in the network system such as the LAN. With use of the sharing function, the clients can use the shared printer as if it is directly connected to each client.

With use of this sharing function, when a client attempts to connect to the printer (or the facsimile device) functioning as a "shared" device, the printer driver (or the facsimile driver) having been installed in the server is automatically installed in the client.

When such an MFP is used as the network device, if various settings related to a certain function (which will be referred to as a first function) are made in a client, a program interface for using the first function, which is provided by an operating system installed to the client, can be used to control the first function.

For example, when the operating system installed in the client is Windows® and the first function of the MFP is a printer function, if the settings for using the printer have been made in the client, the printer can be controlled from the client using a printer API (Application Program Interface) provided by the Windows®.

When the MFP is used as the network device and has a plurality of functions, for example, a first function and a second function, even though the first function is used as the network device, the second function may not be used as the network device. In such a case, various settings for the second function should be made in each client in order to control the MFP from each client, which requires a user for troublesome operations.

It may be possible to use the MFP not as the network device but as a local device for each terminal (i.e., each client has its own MFP). However, practically, such a configuration is sometimes redundant and generally too expensive to provide the MFP for each terminal.

SUMMARY OF THE INVENTION

The present invention is advantageous in that an installing system is provided with which an MFP on a network can be controlled by each client without making troublesome settings for respective functions of the MFP in each client.

The present invention is also advantageous in that installing operation of driver software for a plurality of functions of an MFP on the network in each client is simplified.

According to an aspect of the invention, there is provided a method of installing a device driver for a system including a multifunction device having at least a first function and a second function, a first terminal device and a second terminal device, the multifunction device being connected to the first terminal device, the first terminal device and the second terminal device being connected through a network. A first device driver for the first function and a second device driver for the second function are installed in the second terminal device. The method includes the steps of setting to connect the second device to the multifunction device through the first terminal device with respect to the first function, installing the first device driver, which is installed in the first terminal device, in the second terminal device, the second device driver being installed in the second terminal device as a part of the first device driver, and initializing the first device driver installed in the second terminal device, the second device driver being initialized during the initialization of the first device driver.

According to embodiments, the first terminal device and the second terminal device are connected through interfaces that are different from the network through which the first terminal device and the second terminal device are connected.

Optionally, the step of installing includes the steps of copying the first device driver from the first terminal device to a predetermined folder in the second terminal device, the second device driver being copied in the predetermined folder in the second terminal device as a part of the first device driver, and copying the second device driver to a folder, in the second terminal device, corresponding to the second function of the multifunction device.

Further, in the above method, the second device driver may include a second device driver for a host and a second device driver for a client, and the step of installing the first device driver may include the step of copying only the second device driver for the client to the folder corresponding to the second function of the multifunction device.

According to another aspect of the invention, there is provided a method of installing a device driver for a system including a multifunction device having at least a first function and a second function, a first terminal device and at least one second terminal device, the multifunction device being connected to the first terminal device, the first terminal device and the second terminal device being connected through a network. Such a method may include the steps of installing a first device driver for the first function and a second device driver for the second function in the first terminal device, the second driver being installed in the first terminal device as a part of the first device driver, initializing the first device driver installed in the first terminal device, the second device driver being initialized during the initialization of the first device driver, setting to connect the at least one second terminal device to the multifunction device through the first terminal device with respect to the first function, installing the first device driver from the first terminal device to the second terminal device, the second device driver being installed in the second terminal device as a part of the first device driver and initializing the first device driver installed in the second terminal device, the second device driver being initialized during the initialization of the first device driver.

In the above method, the second driver may include a second driver for a host and a second driver for a client, and each of the steps of installing may include the steps of determining whether the terminal device in which the initializing is performed is the host or client, and selecting one of the second driver for the host or the second driver for the client to be initialized based on the determination in the step of the determining.

According to a further aspect of the invention, there is provided a method of installing a device driver for a system including a multifunction device having at least a first function of one of a printer and a facsimile device and a second function other than the function of the printer and the facsimile device, a first terminal device installed with an operating system provided with a sharing function of the first function. The method may include the steps of installing, as a part of a first device driver corresponding to the first function of the multifunction device, a second device driver corresponding to the second function in the first terminal device, initializing the first driver installed in the first terminal device, the second device driver being initialized during the initialization of the first device driver, performing a setting, in the first terminal device related to the sharing function of the multifunction device with respect to the first function, setting to connect the second terminal device to the multifunction device through the first terminal device with respect to the first function in the second terminal device, installing, from the first terminal device to the second terminal device, the second device driver as a part of the first device driver installed in the first terminal device, and initializing the second device driver installed in the second terminal device by initializing the first device driver in the second terminal device.

Optionally, the second driver may include a second driver for a host and a second driver for a client, and each of the steps of installing may include the steps of determining whether the terminal device in which the initializing is performed is the host or client, and selecting one of the second driver for the host or the second driver for the client to be initialized based on the determination in the step of the determining.

According to a furthermore aspect of the invention, there is provided a computer accessible recording medium containing programs defining, when executed by a computer, a method of installing a device driver for a system including a multifunction device having at least a first function and a second function, a first terminal device and a second terminal device, the multifunction device being connected to the first terminal device, the first terminal device and the second terminal device being connected through a network, the first terminal device being installed with a first device driver for the first function and a second device driver for the second function. The programs is executed by the second terminal device, and the method includes the steps of setting to connect the second device to the multifunction device through the first terminal device with respect to the first function, installing the first device driver, which is installed in the first terminal device, in the second terminal device, the second device driver being installed in the second terminal device as a part of the first device driver, and initializing the first device driver installed in the second terminal device, the second device driver being initialized during the initialization of the first device driver.

According to another aspect of the invention, there is provided a computer accessible recording medium containing programs defining, when executed by a computer, a method of installing a device driver for a system including a multifunction device having at least a first function and a second function, a first terminal device and at least one second terminal device, the multifunction device being connected to the first terminal device, the first terminal device and the second terminal device being connected through a network, the programs being executed by the first terminal device and second terminal device. The method may include the steps of installing a first device driver for the first function and a second device driver for the second function in the first terminal device, the second driver being installed in the first terminal device as a part of the first device driver, initializing the first driver installed in the first terminal device, the second device driver being initialized during the initialization of the first device driver, setting to connect the at least one second terminal device to the multifunction device through the first terminal device with respect to the first function, installing the first device driver from the first terminal device to the second terminal device the second device driver being installed in the second terminal device as a part of the first device driver, and initializing the first device driver installed in the second terminal device, the second device driver being initialized during the initialization of the first device driver.

According to a further aspect of the invention, there is provided a computer accessible recording medium containing a first device driver and a second device driver respectively for a first function and a second function executable by a multifunction device, the first device driver and the second device driver being installed in accordance with a method of installing a device driver for a system including the multifunction device, a first terminal device and at least one second terminal device, the multifunction device being connected to the first terminal device, the first terminal device and the second terminal device being connected through a network. The method includes the steps of installing a first device driver for the first function and a second device driver for the second function in the first terminal device, the second driver being installed in the first terminal device as a part of the first device driver, initializing the first driver installed in the first terminal device, the second device driver being initialized during the initialization of the first device driver, setting to connect the at least one second terminal device to the multifunction device through the first terminal device with respect to the first function, installing the first device driver from the first terminal device to the second terminal device, the second device driver being installed in the second terminal device as a part of the first device driver, and initializing the first device driver installed in the second terminal device, the second device driver being initialized during the initialization of the first device driver.

According to a further aspect of the invention, there is provided a computer accessible recording medium containing programs defining, when executed by a computer, a method of installing a device driver for a system including a multifunction device having at least a first function of one of a printer and a facsimile device and a second function other than the function of the printer and the facsimile device, a first terminal device installed with an operating system provided with a sharing function of the first function, the programs being executed by the first terminal device and second terminal device. The method may include the steps of installing, as a part of a first device driver corresponding to the first function of the multifunction device, a second device driver corresponding to the second function in the first terminal device, initializing the first driver installed in the first terminal device, the second device driver being initialized during the initialization of the first device driver, performing a setting, in the first terminal device, related to the sharing function of the multifunction device with respect to the first function, setting to connect the second terminal device to the multifunction device through the first terminal device with respect to the first function in the second terminal device, installing, from the first terminal device to the second terminal device, the second device driver as a part of the first device driver installed in the first terminal device, and initializing the second device driver installed in the second terminal device by initializing the first device driver in the second terminal device.

According to another aspect of the invention, there is provided a computer accessible recording medium containing a first device driver and a second device driver respectively for a first function and a second function executable by a multifunction device, the first function being one of a printer and a facsimile device and the second function being a function other than the function of the printer and the facsimile device, the first device driver and the second device driver being installed in accordance with a method of installing a device driver for a system including the multifunction device, a first terminal device installed with an operating system provided with a sharing function of the first function. The method includes the steps of installing, as a part of a first device driver corresponding to the first function of the multifunction device, a second device driver corresponding to the second function in the first terminal device, initializing the first driver installed in the first terminal device, the second device driver being initialized during the initialization of the first device driver, performing a setting, in the first terminal device, related to the sharing function of the multifunction device with respect to the first function, setting to connect the second terminal device to the multifunction device through the first terminal device with respect to the first function in the second terminal device, installing, from the first terminal device to the second terminal device, the second device driver as a part of the first device driver installed in the first terminal device, and initializing the second device driver installed in the second terminal device by initializing the first device driver in the second terminal device.

According to a further aspect of the invention, there is provided a method of controlling an electronic device having at least a first function and a second function from a terminal device communicable with the electronic device the terminal device being installed with an operating system that provides a program interface for using the first function, the method comprising the step of instructing the electronic device with respect to the second function using the program interface for using the first function.

Optionally, the program interface for using the first function may include a first program interface that transmits data to the first function and a second program interface that reads data from the first function.

According to a furthermore aspect of the invention there is provided a method of controlling an electronic device having at least a printer function and a facsimile function from a terminal device communicable with the electronic device, the terminal device being installed with an operating system that provides a program interface for using the printer function. The method includes the steps of instructing execution of the scanner function using the program interface for using the printer function provided by the operating system installed in the terminal device, and instructing receipt of data obtained by the execution of the scanning function using the program interface for using the printer function provided by the operating system installed in the terminal device.

Optionally, the step of instructing receipt of data may use a communication using a Named Pipe function.

Further optionally, the program interface for using the printer function provided by the operating system installed in the terminal device may include a first program interface that writes data in the printer function and a second program interface that reads our data from the printer function. Further, the step of instructing execution of the scanner function may use the first program interface, and the step of instructing receipt of data may use the second program interface.

Further optionally, the step of instructing receipt of data may use a communication using a Named Pipe function.

According to another aspect of the invention, there is provided a computer accessible recording medium containing a program defining a method of controlling an electronic device having at least a first function and a second function from a terminal device communicable with the electronic device, the terminal device being installed with an operating system that provides a program interface for using the first function, the method comprising the step of instructing the electronic device with respect to the second function using the program interface for using the first function, the program contained in the recording medium being executed by the terminal device.

According to a further aspect of the invention, there is provided a computer accessible recording medium containing a program defining a method of controlling an electronic device having at least a printer function and a facsimile function from a terminal device communicable with the electronic device, the terminal device being installed with an operating system that provides a program interface for using the printer function, the program contained in the recording medium being executed by the terminal device. The method may include the steps of instructing execution of the scanner function using the program interface for using the printer function provided by the operating system installed in the terminal device, and instructing receipt of data obtained by the execution of the scanning function using the program interface for using the printer function provided by the operating system installed in the terminal device.

According to a further aspect of the invention, there is provided a device driver setting system for a system having a multifunction device and a terminal device communicably connected with each other, the multifunction device having at least a first function and a second function, the terminal device being implemented with a first device driver that is driver software for the first function and a second device driver that is driver software for the second function, the device driver setting system setting information concerning the multifunction device to each of the first device driver and the second device driver. The device driver setting system may include a registering system that writes at least a part of the information concerning the multifunction device in an area which is accessible by the second device driver when the information concerning the multifunction device is set to the first device driver by a user. The second device driver may Include a data acquisition system that reads out the at least a part of information concerning the multifunction device written in the area accessible by the second device driver, and a data setting system that sets the at least a part of information concerning the multifunction device read out from the area by the data acquisition system to the second device as the information concerning the multifunction device for the second device driver.

Optionally, the registering system may be provided to the first device driver.

Still optionally, the data acquisition system and the data setting system may function when the second device driver is executed.

Further optionally, the first function may be a printer function and the second function may be a scanner function.

Still optionally, the terminal device may be installed with Microsoft Windows® as an operating system thereof, the area accessible by the second device driver is a private area of a DEVMODE structure, and the acquisition system uses a GetPrinter API.

Alternatively, the terminal device is installed with Microsoft Windows® as an operating system thereof, the area accessible by the second device driver is an area within a registry, and the acquisition system uses a GetPrinter API.

According to another aspect of the invention, there is provided a computer accessible recording medium containing a program to be executed by a computer which is communicably connected with a multifunction device having at least a first function and a second function, the computer being implemented with a first device driver for the first function and a second device driver for the second function the program defining a procedure which writes at least a part of the information concerning the multifunction device in an area which is accessible by the second device driver when the information concerning the multifunction device is set to the first device driver by a user.

According to a further aspect of the invention, there is provided a computer accessible recording medium containing a program to be executed by a computer which is communicably connected with a multifunction device having at least a first function and a second function, the computer being implemented with a first device driver for the first function and a second device driver for the second function, the program provides, when executed by the computer, a data acquisition system that reads out the at least a part of information concerning the multifunction device written by the first device driver in the area accessible by the second device driver, and a data setting system that sets the at least a part of information concerning the multifunction device read out from the area by the data acquisition system to the second device as the information concerning the multifunction device for the second device driver.

According to a further aspect of the invention, there is provided a computer accessible recording medium storing a program which is executed by a computer to realize an initialization of a device driver for a system including a multifunction device having at least a first function and a second function different from the first function, and a terminal device to which a first device driver corresponding to the first function and a second device driver corresponding to the second function are installed, the program defining a procedure of initializing the first device driver, the second device driver being initialized during the initialization of the first driver.

In a particular case, files for the first device driver and the second device driver are copied in a same folder that corresponds to the first device driver of an operation system of the terminal device, and the files for the second device driver are copied to an appropriate folder during the initialization of the first device driver. Optionally, the files for the second device driver are registered with a registry of the operation system of the terminal device.

The above described methods, systems and devices can be realized by a computer when appropriate programs are provided. Such programs may be distributed to other computers as stored in a recording medium such as an FD, CD-ROM or DVD. Optionally or alternatively, such programs can be distributed through a network such as a LAN, WAN and the Internet.

BRIEF DESCRIPTION OF THE ACCOMPANYING DRAWINGS

Figure 16:
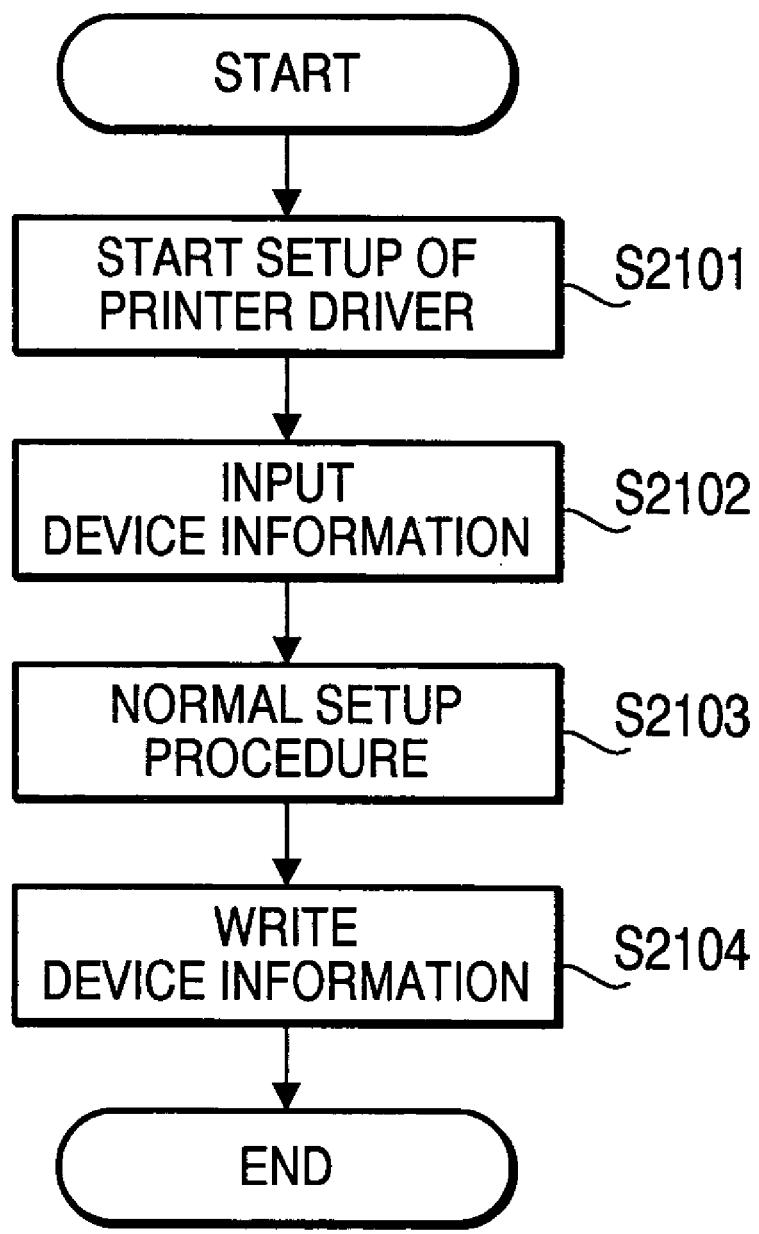
Figure 17:
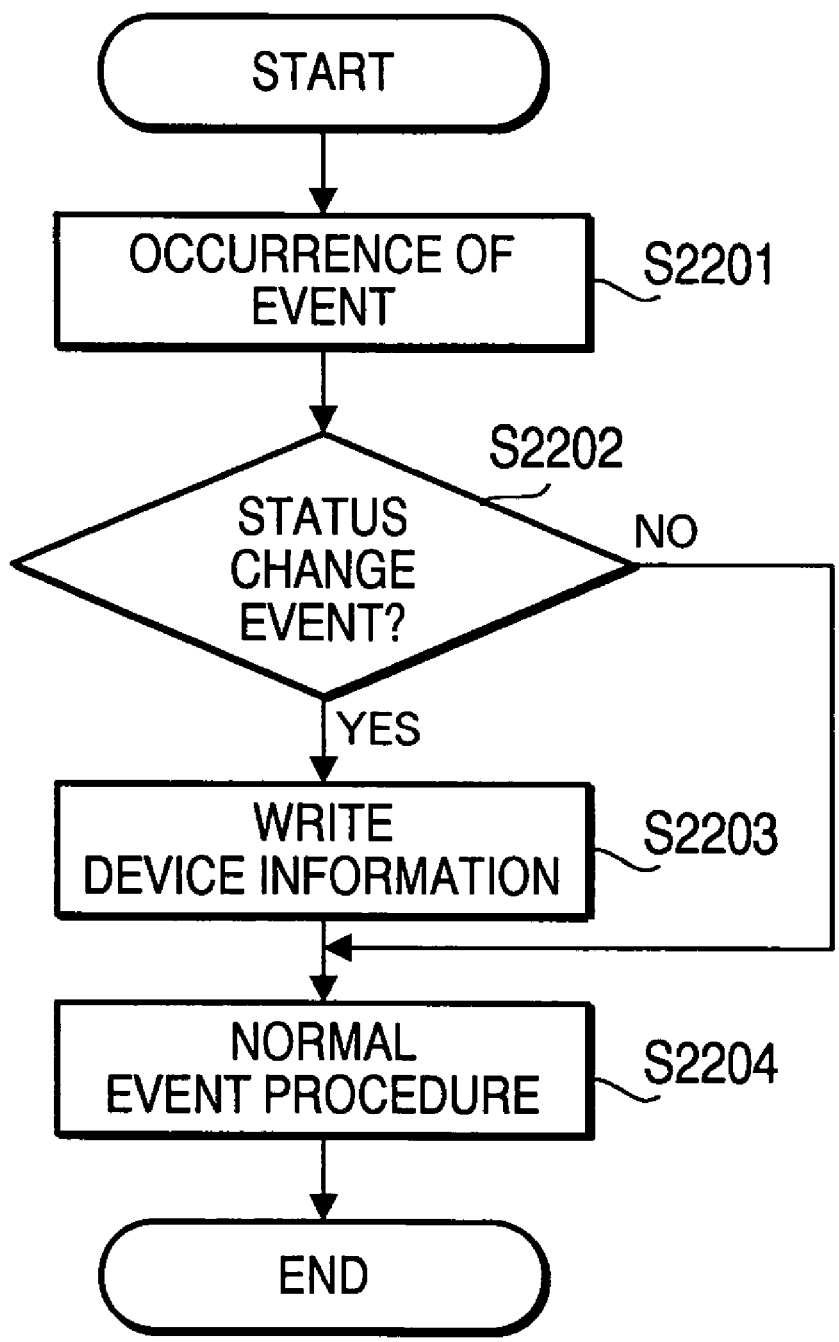
Figure 18:
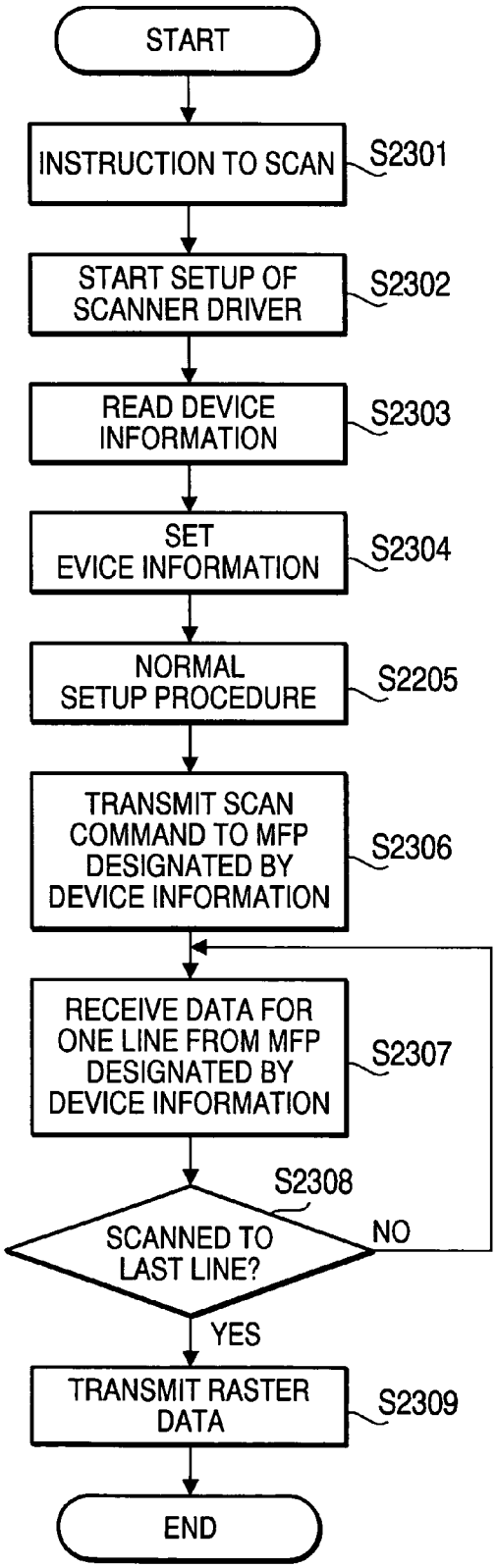
Figure 19:
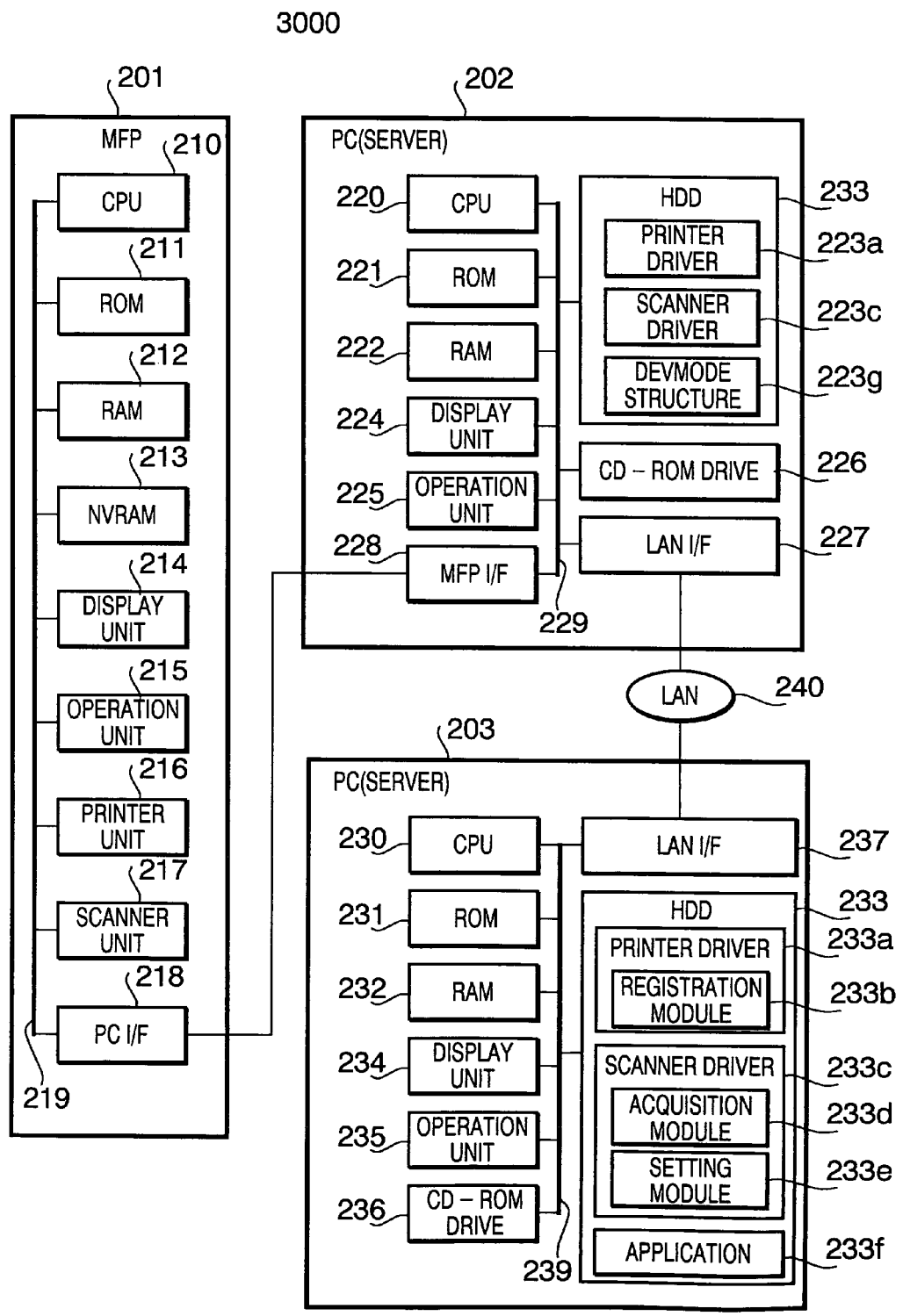
Figure 20:
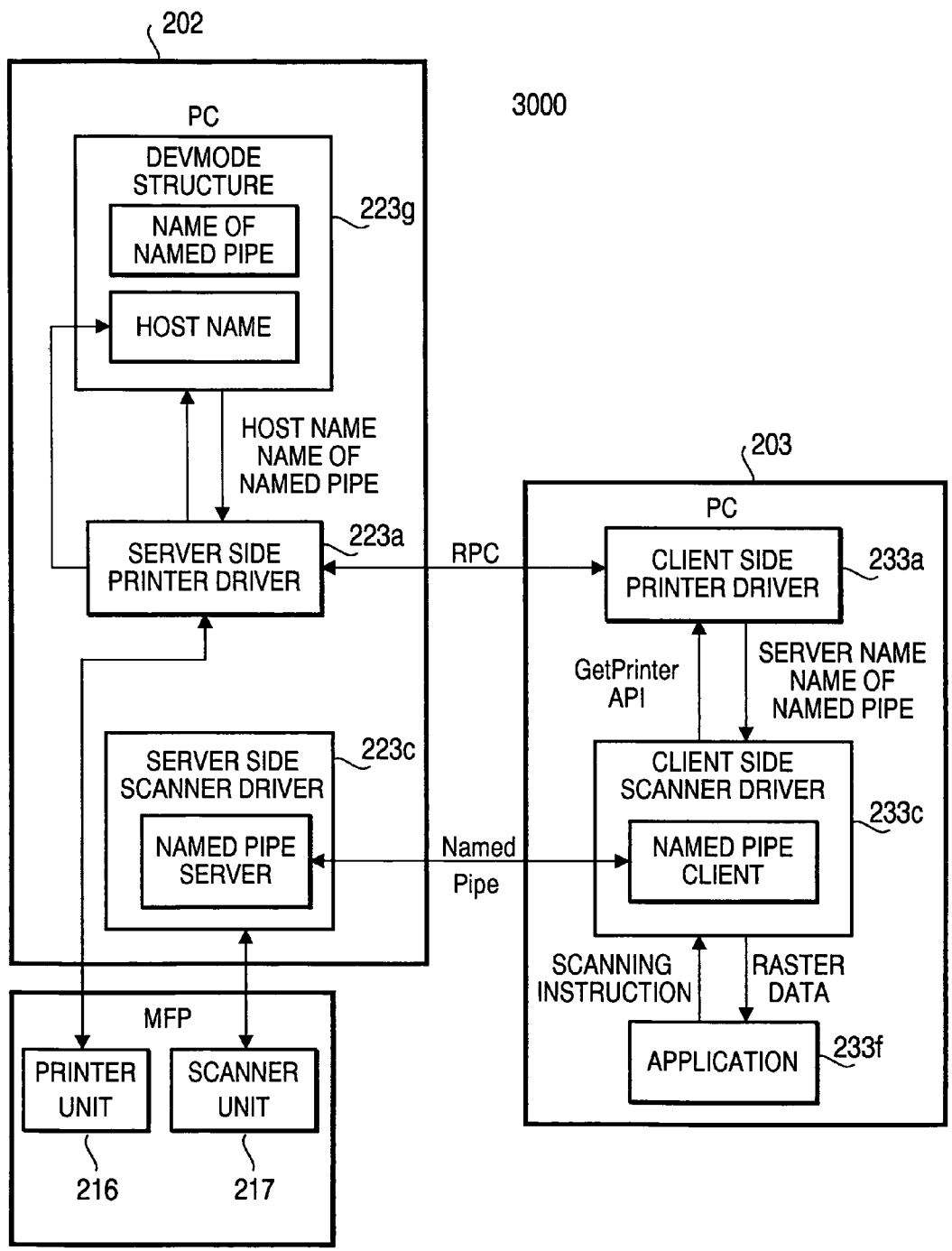
Figure 21:
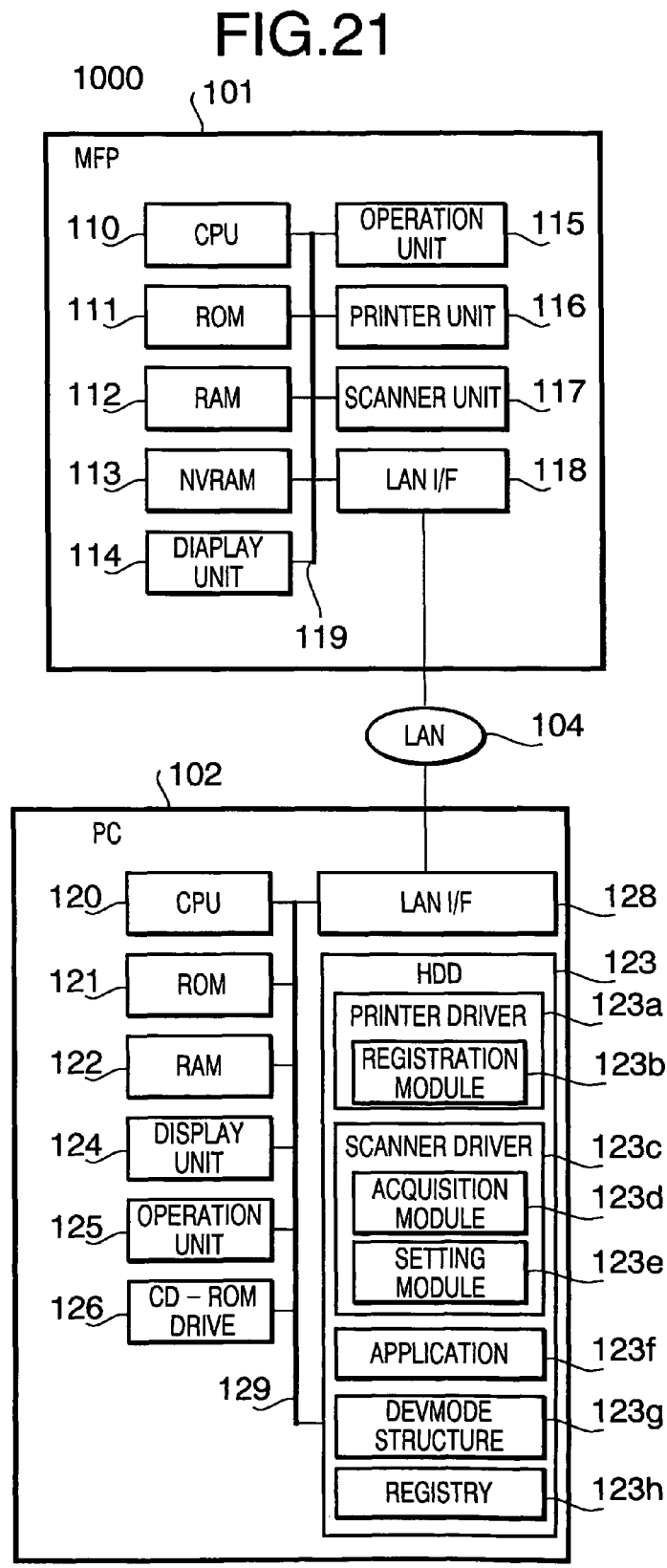
Figure 22:
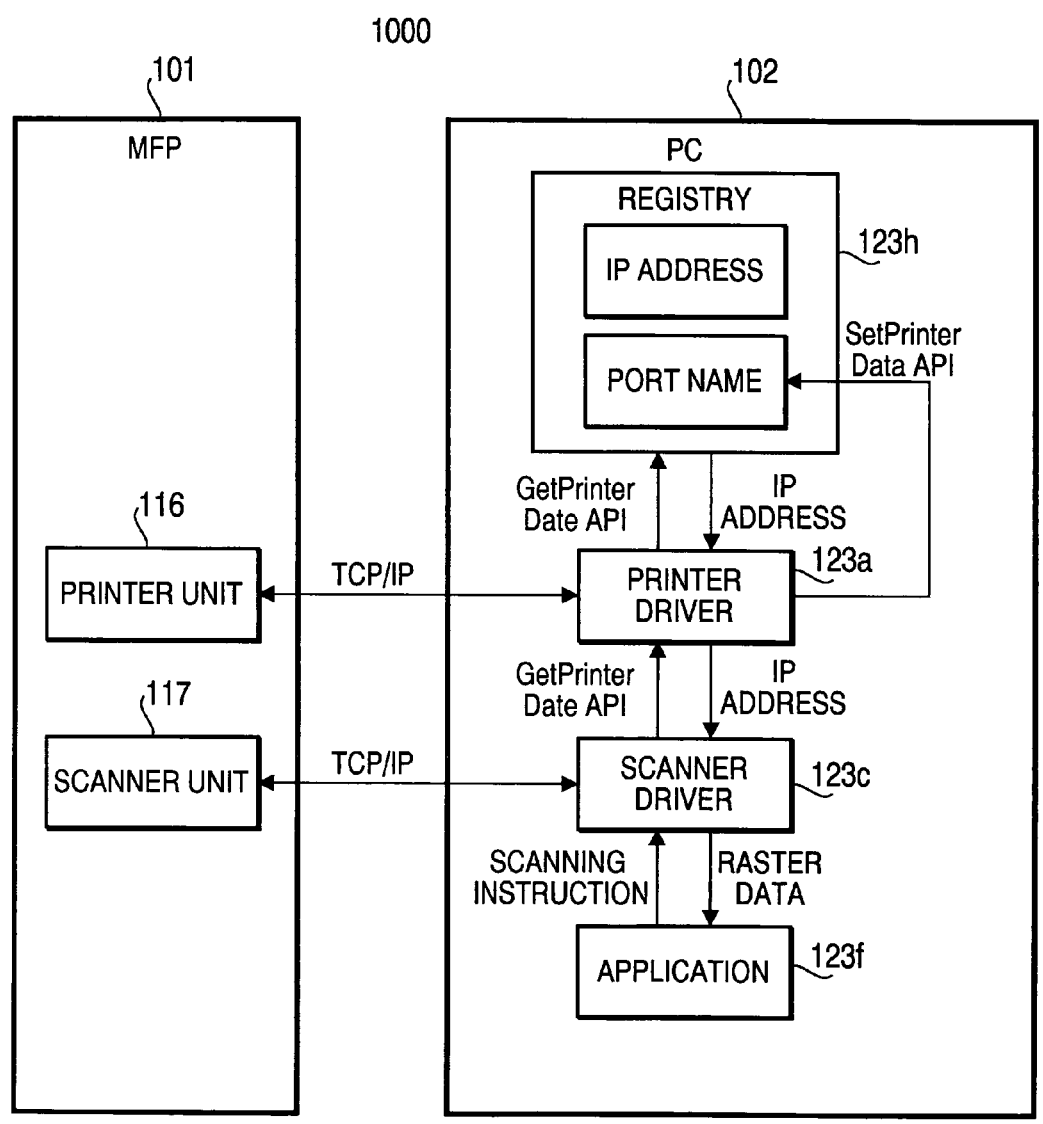

FIG. 15 schematically shows a DEVMODE structure;

FIG. 16 shows a flowchart illustrating the setup procedure when the user installs the printer driver in the PC;

FIG. 17 shows a flowchart illustrating a status changing procedure of the printer driver;

FIG. 18 shows a flowchart illustrating a scanning procedure of the scanner driver;

FIG. 19 schematically shows a configuration of the driver setting system according to the third embodiment;

FIG. 20 schematically shows data flow of the driver setting system according to the third embodiment;

FIG. 21 is a block diagram of a driver setting system according to a modification of the third embodiment;

FIG. 22 shows data flow in the driver setting system shown in FIG. 21.

DETAILED DESCRIPTION OF THE EMBODIMENTS

Hereinafter, embodiments according to the invention will be described in detail with reference to the accompanying drawings.

First Embodiment

Figure 1:
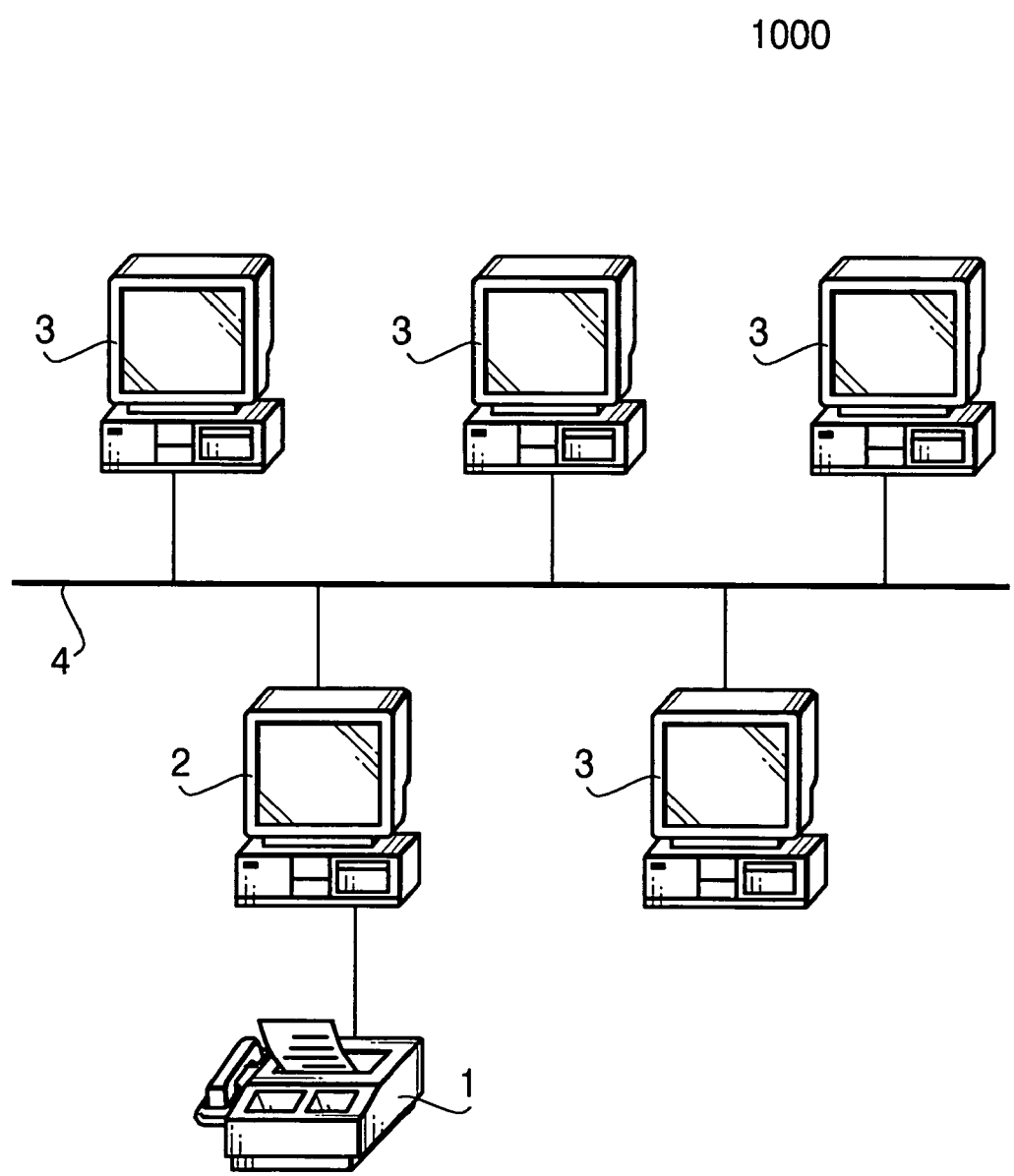
FIG. 1 is a diagram showing a general configuration of a network.

FIG. 1 generally shows a structure of a network system 100 to which a first embodiment of the present invention is applicable.

As shown in FIG. 1, the network system 100 includes an MFP (Multi-Function Peripheral) 1 and first terminal device 2 and second terminal devices 3. The MFP 1 is connected to the first terminal device 2, which functions as a host of the MFP 1, or a server for the network system 100. The first and second terminal devices 2 and 3 are interconnected through a network 4.

In this network system 100, the MFP 1 is an electronic device to be used by each of the first and second terminals 2 and 3. In the following description, the first terminal device 2 directly connected to the MFP 1 will occasionally be referred to as the server, and the second terminal devices 3 which use the MFP 1 through the server 2 will occasionally be referred to as clients.

The MFP 1 may have a function of a telephone to perform a telephone communication with a destination connected to a public telephone network, a function of a facsimile to transmit/receive image data (i.e., facsimile data) to/from another similar device, a function of a printer to print out data output by a terminal device mainly on a sheet of paper, and a function of a scanner to scan an image formed on a sheet of paper of film. The MFP 1 includes an interface which is used when data communication is performed with the first terminal device 2.

According to the first embodiment, as the terminal first and second devices 2 and 3, PCs (personal computers) can be used. As the network 4, a wired and/or a wireless LAN can be used.

The first terminal device 2 has an operating system (hereinafter occasionally referred to as an OS) which provides a printer sharing function. Examples of such an OS is Windows® and Mac OS®.

Further, each of the first terminal device 2 and the second terminal devices 3 has an interface enabling data communication therebetween through the network 4.

The second terminal device 2 further has an interface through which data communication is performed with the MFP 1. In the second terminal devices 3, settings for the MFP 1 are made using the sharing function provided by the first terminal device 2. It should be noted that the operating system installed in the first terminal device 2 provides a printer sharing function, but does not provide the sharing function for any other devices (e.g., a scanner).

Figure 2:
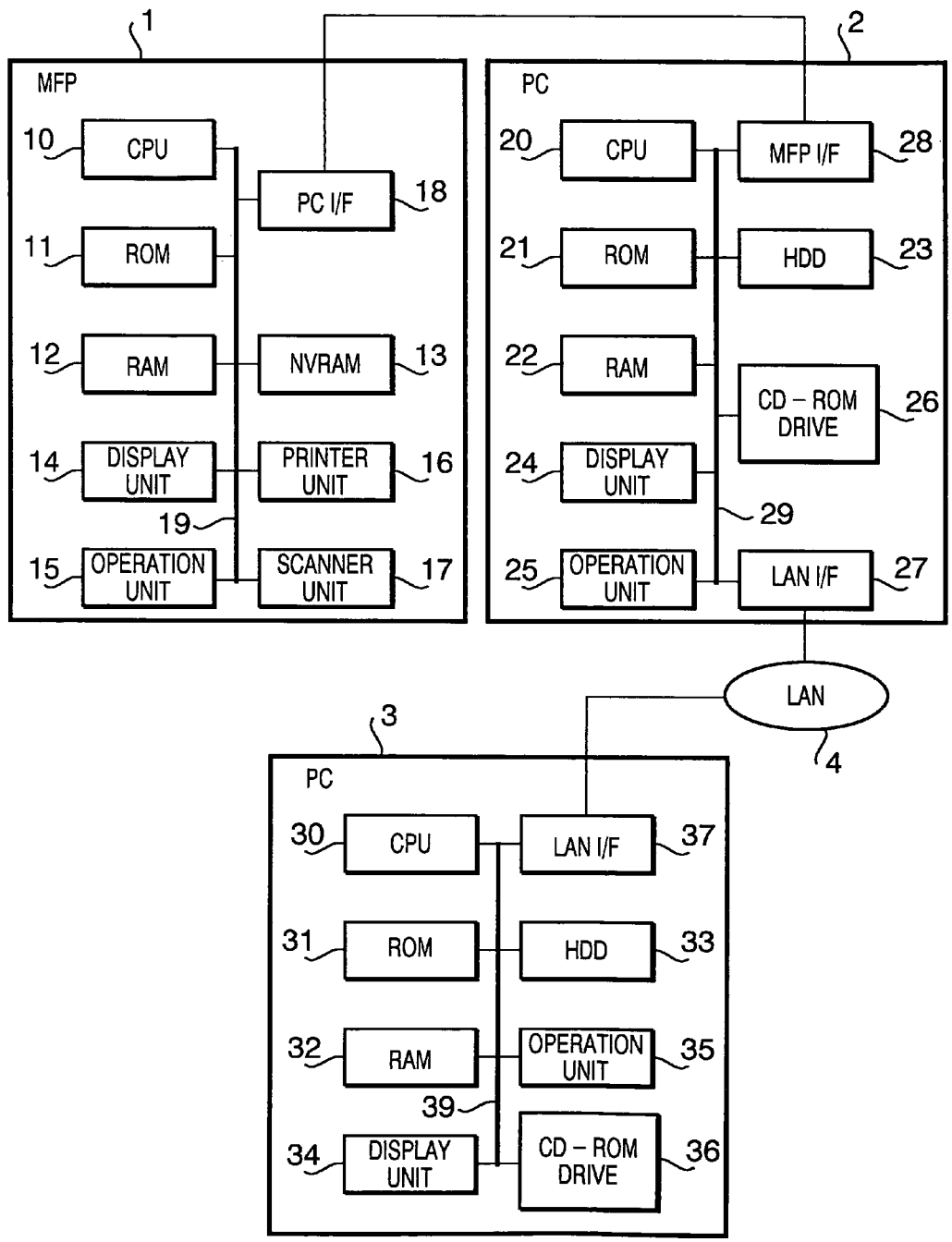
FIG. 2 shows a block diagram illustrating a system structure.

Next, the block diagram shown in FIG. 2 will be described. FIG. 2 shows an exemplary structure of the network system 100 according to the first embodiment. For the brevity, only one of the clients (i.e. the second terminal devices) 3 is indicated. Further, the server 2 is represented by a PC 2, and the client 3 is represented by another PC 3.

The MFP 1 connected to the PC 2, which is connected with the PC 3 through the LAN 4. In the following description, in order to simplify the description, only functions of a printer and a scanner of the MFP 1 will be described. Further, in the following description, the printer function will be occasionally referred to as a first function, and the scanner function will be occasionally referred to as a second function.

As shown in FIG. 2, the MFP 1 has a CPU (Central Processing Unit) 10, a ROM (Read Only Memory) 11, a RAM (Random Access Memory) 12, an NVRAM (Non Volatile RAM) 13, a display unit 14, an operation unit 15, a printer unit 16, a scanner unit 17 and a PC interface (PC I/F) 18, which are interconnected through a system bus 19.

The CPU 10 controls an entire operation of the MFP 1. The CPU 10 analyses commands transmitted form the PC 2, and performs various operations in accordance with the commands (e.g., to control the scanner unit 16 to provide the scanner function, or to control the printer unit 17 to provide the printer function).

The ROM 11 is a read-only storage and provides a part of a main memory space utilized by the CPU 10. The RAM 12 is a readable/writable storage which also provides a part of the main memory space for the CPU 10 similar to the ROM 11. The NVRAM 13 is a non-volatile RAM that stores data to be rewritten.

The display unit 14 includes a display device (e.g., a liquid crystal display) for displaying data to be output. The display unit 14 is connected to the system bus 19 through an input/output (I/O) interface.(not shown). The display unit 14 is used for displaying data related to the functions of the MFP 1 such as the printing information.

The operation unit 15 is an input device provided to the MFP I for accepting operation by a user. The operation unit 15 is also connected to the system bus 19 through a not-shown I/O interface. The operation unit 15 is used for inputting data related to respective functions of the MFP 1. The operation unit 15 includes, for example, keyboard provided with a predetermined number of depression switches.

The printer unit 16 is a device provides a printer function for printing monochromatic or color characters and/or images. The printer unit 16 is connected to the system bus 19 through the I/O interface (not shown). The printer unit 16 prints out the print data transmitted by the PC 2, or PC 3 through the PC 2, in accordance with the command by the CPU 10.

The scanner unit 17 includes a device that provides a scanner function for reading image formed on a sheet of paper or film. The scanner unit 17 is connected to the system bus 19 through a not-shown I/O interface. The scanner unit 17 executes a scanning operation, in accordance with a command from the CPU 10, to scan an image formed on an original set to the MFP 1 and generate scan data (raster data), which is transmitted to the PC 2, or the PC 3 through the PC 2.

The PC interface (PC I/F) 18 is used for connecting the MFP 1 to an MFP I/F 28 of the PC 2 so as to enable data communication between the PC 2 and the MFP 1. The PC interface 18 is used for transmitting or receiving operation commands, scan data and print data.

The PC 2 includes a CPU 20, a ROM 21, a RAM 22, an HDD (Hard Disk Drive) 23, a display unit 24, an operation unit 25, a CD-ROM drive 26, a LAN interface (I/F) 27 and the MFP I/F 28, which are interconnected through a system bus 29.

It should be noted that the PC 2 is installed with an operating system (OS) having a printer sharing function, and settings for using the printer function provided by the MFP 1 as a shared printer are made.

The CPU 20 controls the entire operation of the PC 2. Further, the CPU 20 transmits a scanning start command in response to a request for scanning transmitted from the PC 3.

The ROM 21 is a read-only storage, and function as a part of a main memory space used by the CPU 20. The RAM 22 is a readable/writable volatile storage, which also serves as a part of the main memory space of the CPU 20. The HDD 23 is a readable/writable storage (i.e., the hard disk) and its drive. Spooler which is print data to be transmitted to the MFP 1 and/or scan data transmitted from the MFP 1 is stored in the HDD 23.

The display unit 24 is a device for outputting information by displaying the same. The display unit 24 is connected to the system bus 29 through an I/O interface (not shown). The display unit 24 is used for displaying data related to respective functions of the PC 2. The display unit 24 includes, for example, a CRT (cathode ray tube) display or an LCD (liquid crystal display).

The operation unit 25 is an input device provided to the PC 2 for allowing a user to input various commands. The operation unit 25 is connected to the system bus 29 through a not-shown I/O interface. The operation unit 25 is also used for inputting various data related to the functions of the PC 2. The operation unit 25 typically includes a mouse and a keyboard.

The CD-ROM drive 26 is a device for reading data stored in a CD-ROM, and is connected to the system bus 29 through a not-shown I/O interface. It should be noted that the CD-ROM 26 may be replaced with an FD (floppy disk) drive.

The LAN interface 27 is used for connecting the PC 2 with a LAN interface 37 of the PC 3 through the LAN 4. The LAN interface 27 enables data communication between the PC 2 and the PC 3. The LAN interface 27 is used for transmitting or receiving operation commands for the MFP 1, the scan data and the print data.

The MFP interface 28 is for connecting the PC 2 to the PC interface 18 of the MFP 1 so as to enable data communication between the PC 2 and the MFP 1. The MFP interface 28 is used for transmitting or receiving operation commands, scan data and print data.

The PC 3 includes a CPU 30, a ROM 31, a RAM 32 an HDD 33, a display unit 34, an operation unit 35, a CD-ROM drive 36 and the LAN interface 37, which are interconnected through a system bus 39.

The CPU 30 controls the entire operation of the PC 3. Further, the CPU 30 transmits the scanning start command to the MFP 1 through the PC 2. The CPU 30 can control the MFP 1 by executing an electronic device controlling operation (which will be described later).

The ROM 31 is a read-only storage, and function as a part of a main memory space used by the CPU 30. The RAM 32 is a readable/writable volatile storage, which also serves as a part of the main memory space of the CPU 30. The HDD 33 is a readable/writable storage (i.e., the hard disk) and its drive. A program for the electronic device controlling operation, print data to be transmitted to the MFP 1 through the PC 2, the scan data transmitted from the MFP 1 through the PC 2 is stored.

The display unit 34 is a device for outputting information by displaying the same. The display unit 34 is connected to the system bus 39 through an I/O interface (not shown). The display unit 34 is used for displaying data related to respective functions of the PC 3. The display unit 34 includes, for example, a CRT (cathode ray tube) display or an LCD (liquid crystal display).

The operation unit 35 is an input device provided to the PC 3 for allowing a user to input various commands. The operation unit 35 is connected to the system bus 39 through a not-shown I/O interface. The operation unit 35 is used for inputting various data related to the functions of the PC 3. The operation unit 35 typically includes a mouse and a keyboard.

The CD-ROM drive 36 is a device fro reading data stored in a CD-ROM, and is connected to the system bus 39 through a not-shown I/O interface. It should be noted that the CD-ROM 36 may be replaced with an FD (floppy disk) drive.

The LAN interface 37 is used for connecting the PC 3 with the LAN interface 27 of the PC 2 through the LAN 4. The LAN interface 37 enables data communication between the PC 2 and the PC 3. The LAN interface 37 is used for transmitting or receiving operation commands for the MFP 1, the scan data and the print data.

It should be noted that, according to the first embodiment, the program(s) for controlling the MFP may be stored in a removable storage such as the CD-ROM, FD or MO which is directly controlled by the PC 3, or any other device. Further, the program(s) related to the first embodiment may be distributed to other devices and/or systems as stored in the removable storage such as the CD-ROM, FD or MO.

Figure 3:
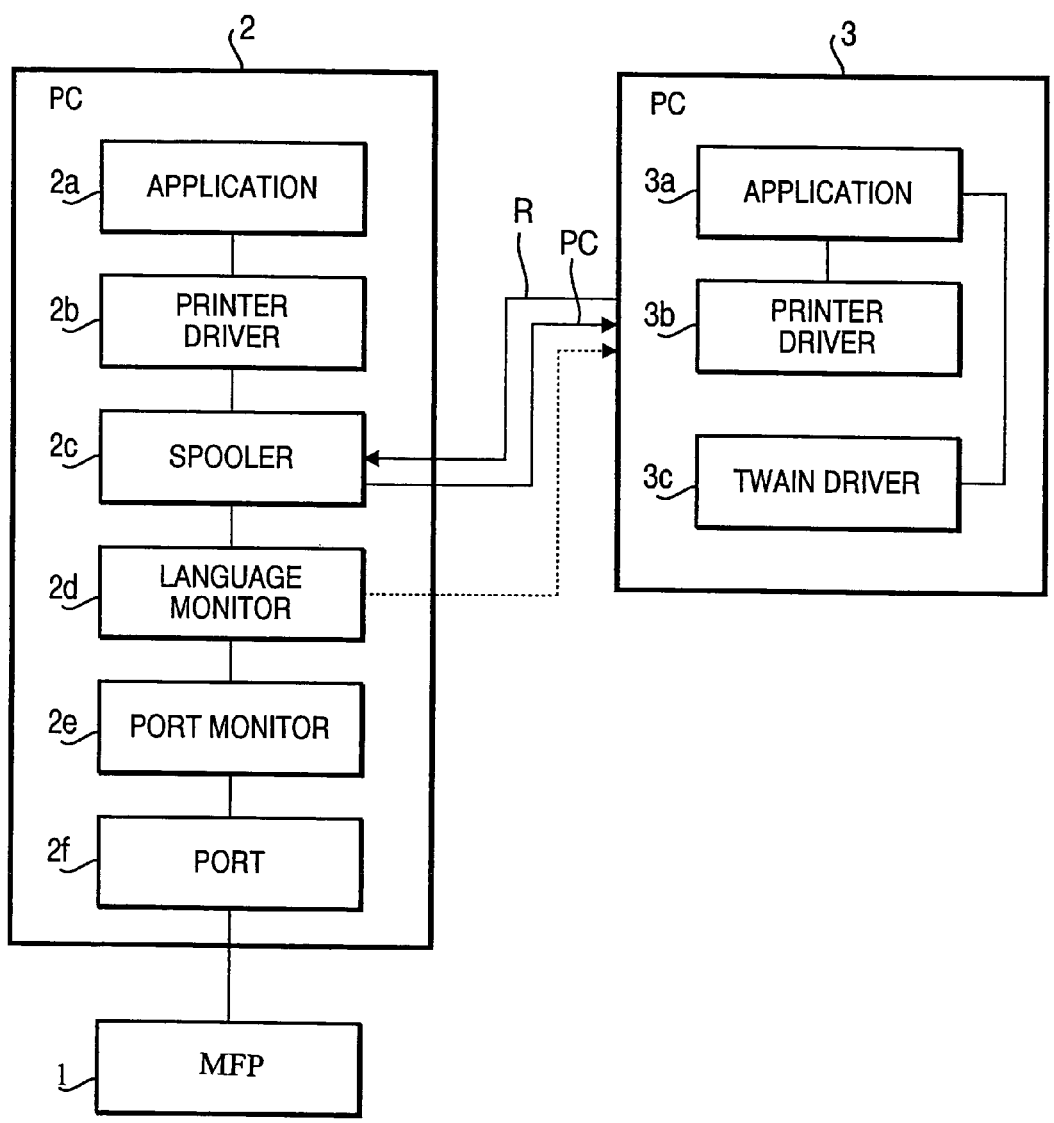
FIG. 3 shows a block diagram illustrating a printing unit of the network system.

Next, the configuration of a printing system included in the network system 100 shown in FIG. 2 will be further described with reference to FIG. 3. FIG. 3 is a block diagram showing a configuration of the printing system.

As shown in FIG. 3, the PC 2 has application software 2*a* such as Microsoft Word®, a printer driver 2*b* which is driver software for the printer function of the MFP 1, a spooler 2*c* which temporarily spools print data, a language monitor 2*d* which checks progression of a printing operation, a port monitor 2*e* that designates a port from which the print data is output, and a port 2*f* to which the MFP 1 is connected. The PC 3 has application software such as Microsoft Word®, a printer driver 3*b* for the printing function of the MFP 1, and a TWAIN driver 3*c* which is driver software for the scanner function of the MFP 1.

A printing command issued by the application software 2*a* or the application software 3*a* is transmitted to the spooler 2*c* of the PC 2 using a program interface for the printer function (when the operating system is Windows®, WritePrinter which is the API for writing the data in the printer) with use of an RPC (Remote Procedure Call), then notifies the designated printer (i.e., MFP 1) that the print data is output. The output data is temporarily spooled by the spooler 2*c*. Then, based on the transmitted printing command, the port from which the print data is output is designated by the port monitor 2*e* with the printing progression being checked by the language monitor 2*d*, and the data is transmitted to the MFP 1 which is connected to the port 2*f*.

If the operating system supports the bi-directional communication between the spooler and the printer function (e.g., Windows 98®), with use of the API (application program interface), which is provided by the printer driver 2*b* or the printer driver 3*b*, for controlling the printer function (when the operating system is Windows®, ReadPrinter which is the API for reading data from the printer), TWAIN driver in the PC 2 or PC 3, which transmitted the print command, can obtain data from the designated printer (i.e., MFP 1) through the spooler 2*c*, using the RPC, as indicated by the solid line in FIG. 3.

If the operating system does not support the bi-directional communication between the spooler and the MFP (e.g., Windows NT®), as indicated by broken lines in FIG. 3, using a Named Pipe. TWAIN driver in the PC 2 or PC 3 can obtain data from the designated printer (i.e., MFP 1) through the language monitor 2*d*.

It should be noted that the Named Pipe is generally used for enabling a communication between applications, and is provided by the operating system (e.g. Windows NT®). With use of the Named Pipe, a communication between different PCs is also possible. This architecture is similar to a method for transmitting data from the language monitor to the status monitor provided to the printer driver, which has been conventionally done and will not be described in detail.

In the first embodiment, a TWAIN drier 3*c*, which is the driver software of the scanner function of the MFP 1, includes a program for controlling the MFP 1. Then, with use of the configuration of the printing system described above, a read command for the scanner function of the MFP 1 issued by the application 3*a* is transmitted to the PC 2 by the RPC (Remote Procedure Call) command using the program interface for the printer function (i.e. when the operating system is Windows®, the WritePrinter command which is the API for the printer). The MFP 1 makes determination by analyzing data/command transmitted by each drive.

Similarly, when the scanned data is received, the TWAIN driver 3c receives the data, using the program interface for the printer function (i.e., when the operating system is Windows®, the ReadPrinter command which is the API for the printer), through the PC 2, using the RPC or the Named Pipe.

It should be noted that the same port is used for the scanner and the printer functions in the MFP 1 and whether the printer function or the scanner function is to be used when the command is transmitted using the program interface (i.e., when the operating system is Windows®, the WritePrinter command which is the API for the printer) is automatically determined by the MFP 1 based on the signal transmitted from one of the drivers in advance.

Next, installation of scanner drivers will be described with reference to FIGS. 4 through 8. In the description, for the clarity of the description, Windows® is the operating system used both in the PC 2 and PC 3.

Figure 4:
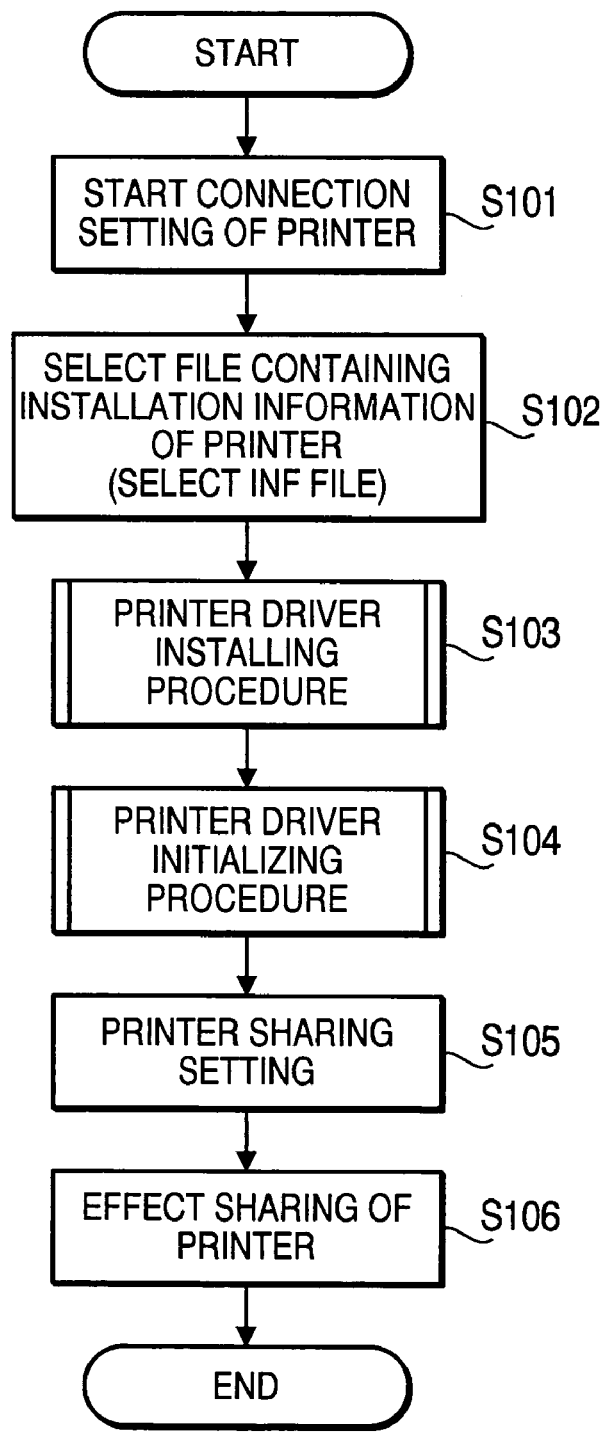
FIG. 4 shows a flowchart illustrating an installation of driver software in a server.
Figure 5:
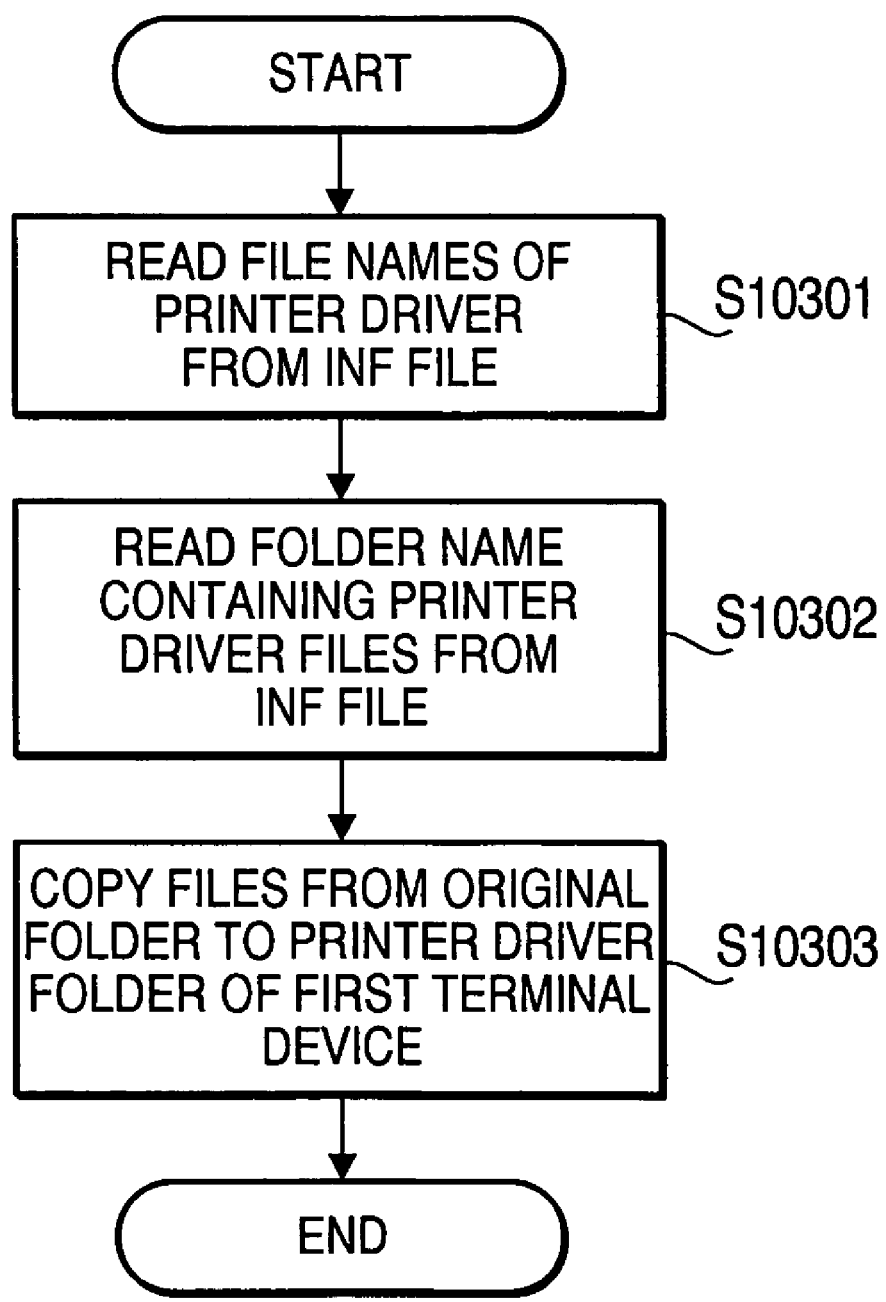
FIG. 5 shows a flowchart illustrating an installation of the driver software in the server.
Figure 6:
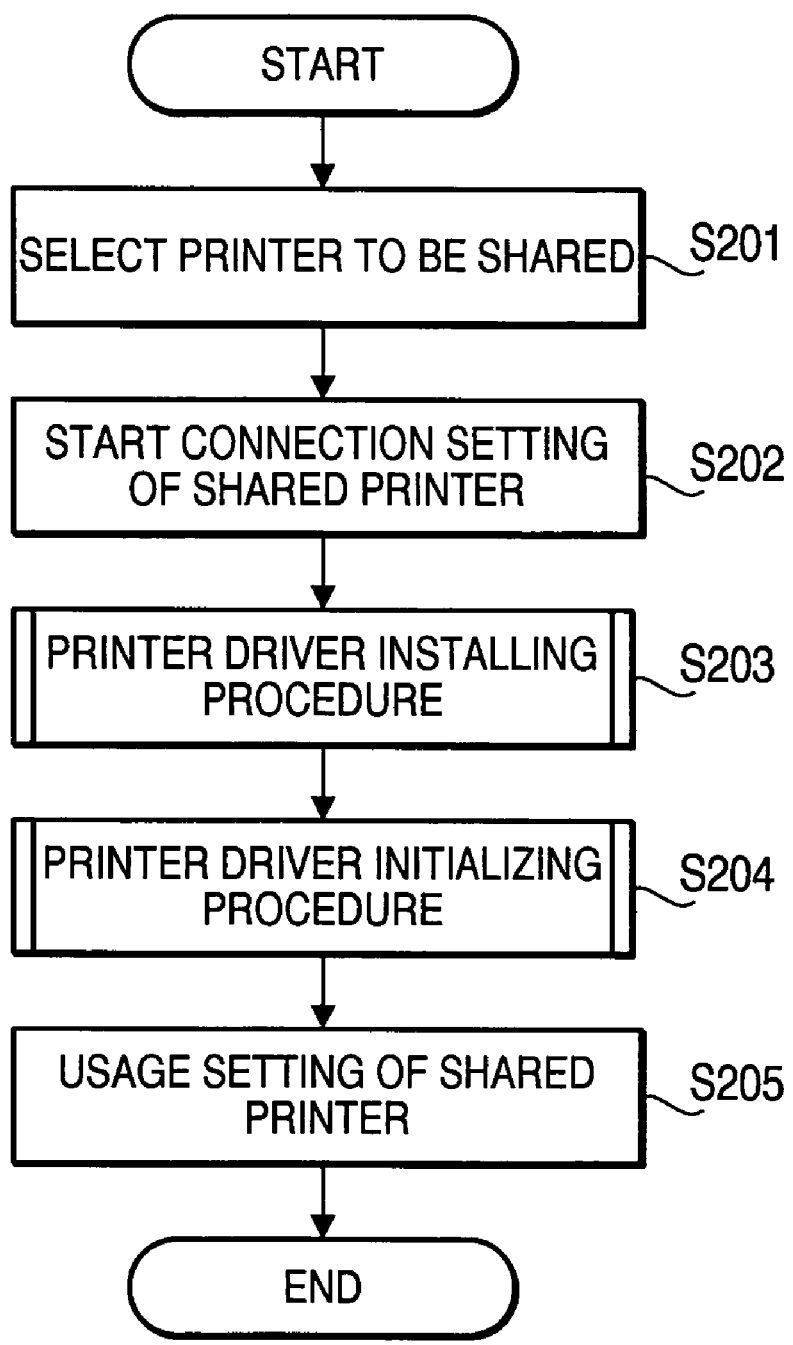
FIG. 6 shows a flowchart Illustrating an installation of driver software in a client.
Figure 7:
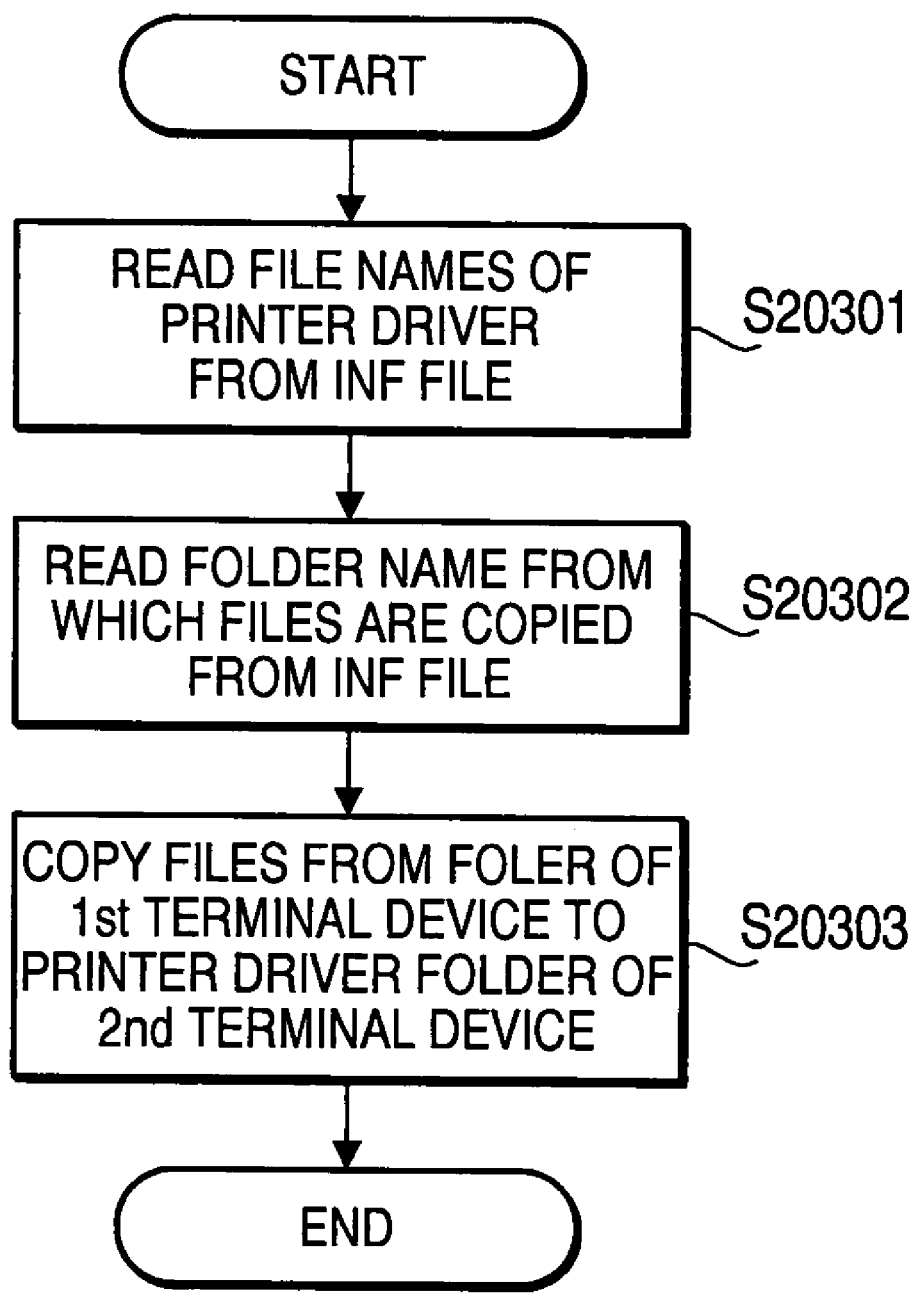
FIG. 7 shows a flowchart illustrating an installation of the driver software in the client.
Figure 8:
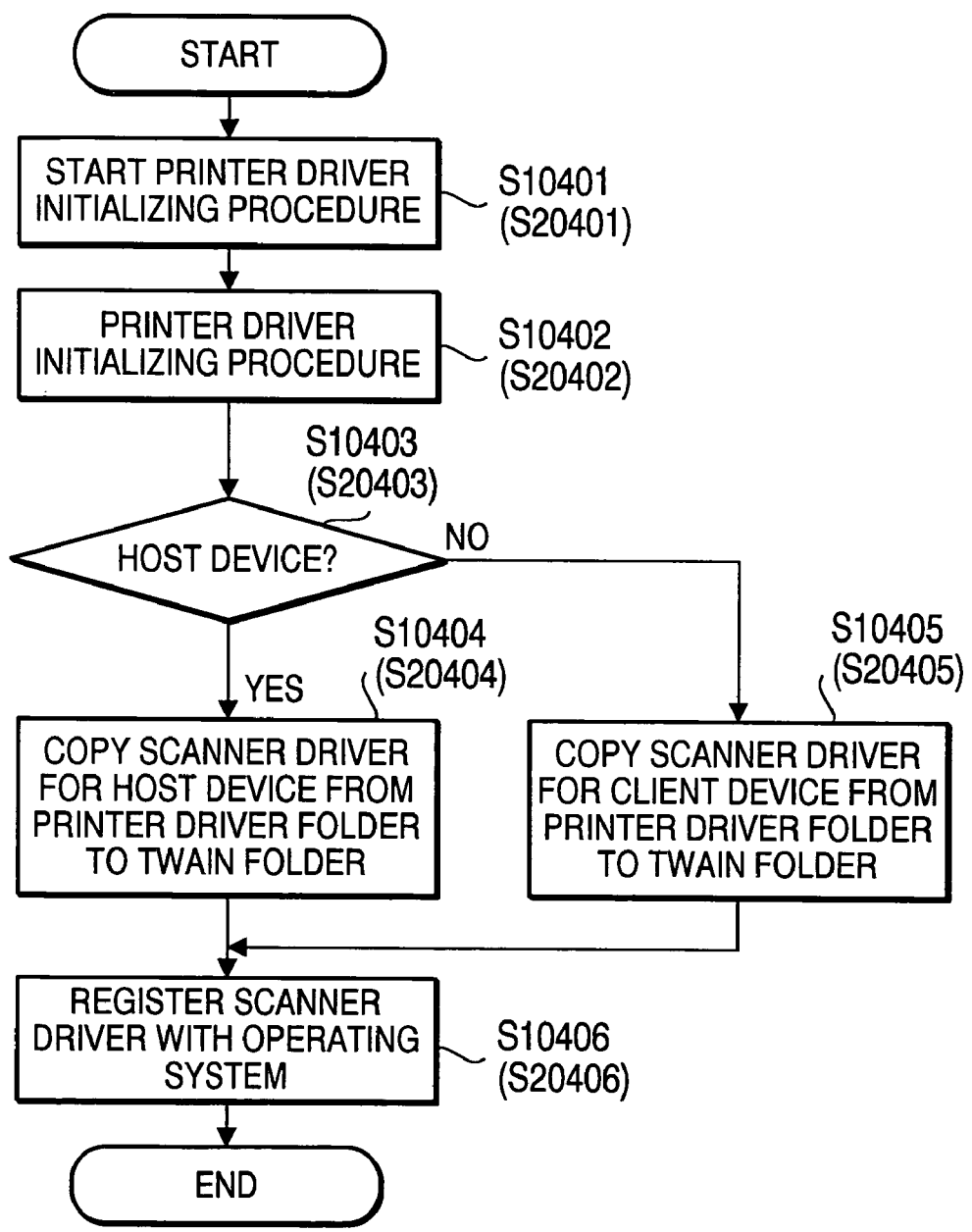
FIG. 8 shows a flowchart illustrating an initialization procedure executed in the server/client.

FIG. 4 shows a flowchart illustrating a main installing procedure in the first terminal (i.e., PC 2), and FIG. 5 shows a flowchart illustrating a printer driver installing procedure in the first terminal. FIG. 6 shows a flowchart illustrating a main installing procedure in a second terminal (i.e. PC 3), and FIG. 7 shows a flowchart illustrating a printer driver installing procedure in the second terminal. FIG. 8 shows an initializing procedure performed in the first terminal (PC 2) or the second terminal (PC 3).

Firstly, the user starts settings a printer function of the MFP 1, on the PC 2, using a function provided by the operating system (S101). Then, a setting file (when the operation system is Windows®, an INF (information) file) containing the installation information for the printer to be installed is selected. It should be noted that such a setting file (i.e., the INF file in this embodiment) is stored in the recording medium such as the HDD or in a removable recording medium such as a CD-ROM, FD and MD, and retrieved therefrom.

The setting file (i.e., INF file in this embodiment) typically contains a list of files to be copied (which list will be referred to as a copy list) and settings to be reflected in a registry. Based on the contents of the setting file, necessary functions of the operating system is called and the installation is executed. It should be noted that, according to the first embodiment, the copy list includes files for the scanner driver as well as the files for the printer driver. Further, the scanner driver includes a driver for a host and a driver for a client.

In S103, the printer driver is installed. The installation of the printer driver is illustrated in detail in FIG. 5.

In FIG. 5, with reference to the copy list contained in the INF file, the file names for the printer driver are read (S10301). Then, a folder name (or a path) at which the files to be copied are stored is obtained from the INF file (S10302). As described above, the copy list includes the files for the scanner driver as well as the files of the printer driver, and the files for both the printer and scanner drivers are retrieved in this procedure. Then, the retrieved files are copied in a printer driver folder of the PC 2 (S10303). With this procedure, the files of the scanner driver as well as the files of the printer driver are copied in the printer driver folder of the PC 2.

When the installation of the printer driver is finished (S103) as shown in FIG. 3, an initialization of the printer driver is executed (S104). The initialization of the printer driver is illustrated in FIG. 8.

In FIG. 8, firstly, a printer driver initialization procedure is initiated (S10401). Then, as the initialization procedure of the printer driver, registration of the printer driver in the system of the PC 2 (e.g., setting of the registry) is executed based on the contents of the INF file (S16402).

Next, an initialization of the scanner driver is executed using the files of the scanner driver copied in the printer driver folder. Since the files of the scanner driver include the file(s) of the scanner driver for the host and the file(s) of the scanner driver for the client, it is firstly determined whether the terminal device to which the driver is installed is the host or client (S10403). When the terminal device is the host (server) device (S10403: YES), the scanner driver files for the host are copied from the printer driver folder to a scanner driver folder (which is a TWAIN (Technology Without Any Interested Name) folder, in this embodiment) in S10404. When the terminal device is the client device (S10403: NO), the scanner driver files for the client are copied from the printer driver folder to the TWAIN folder (S10405). In this case (i.e., when the initialization procedure is called in S104 of the main procedure executed in the PC 2), since the PC 2 is the host device (S10403: YES), the scanner driver files for the host device are copied from the printer driver folder to the TWAIN folder of the PC 2 (S10404).

It should be noted that the scanner driver of the host device (i.e., PC 2) functions as an RPC (Remote Procedure Call) server, which makes the scanner function usable from outside (which will be described in detail later). Depending on the necessity (i.e., depending on whether the specification of the TWAIN driver requires registration with the registry), as an initialization operation for the scanner driver, registration of various data related to the scanner driver with the system of the PC 2 (e.g., setting of the registry) is also executed in S10406. It should be stressed that whether the registration of the various items related to the scanner function is necessary or not depends on how the TWAIN driver is configured. For example a time out period when the data is not transmitted is retrieved from the registry, the initialization operation is necessary.

With the above operation, i.e., in the initialization of the printer driver, the scanner driver is also initialized.

Whether the terminal device is the host device or the client device is determined, for example, by reading the printer name registered with the operating system and checking whether a server name (i.e., host computer name) is provided at the beginning of the printer name, or by checking whether the device is connected to a port such as an LPT.

In the latter case, the determination is made as follows. When the operating system is Windows®, a port is opened (using a function CreateFile( ) of the API of the Windows®) and a device ID is checked (using a function DeviceIoCreate( ) of the API of the Windows®). If there is a response, the port is a local port, which means the terminal device is the host device. If there is no response, the port is considered to be a remote port, which means the terminal device is the client. After the port is checked as above, the port is closed using a function CloseHnadle( ) of the API of the Windows®.

As shown in FIG. 4, after the initialization of the printer is finished (S104), a sharing setting of the printer function of the MFP 1 is received (S105). In this step, an API, SetPrinter is called and settings related to the sharing (e.g., setting of a common name) is performed. Then, using the function provided by the operating system, the printer function of the MFP 1 is shared (S106). Accordingly, in the second terminal device (i.e., the PC 3 on the LAN 4, In this embodiment), the printer can be referred to as the shared device, and connection settings for the printer can be done in the PC 3.

In the above example, the setting to share the printer function of the MFP 1 is manually done, which is received in S105. However, this setting can be performed automatically with the installing program.

Next, the installing procedure in the second terminal device (i.e., PC 3) will be described with reference to FIGS. 6 through 8.

The installation in the PC 3 is executed after the installation in the PC 2 (FIGS. 4, 5 and 8) is executed.

Firstly, as shown in FIG. 6, the printer function of the MFP 1, which has been set to function as the shared printer by the PC 2, is selected in the PC 3 (S201). In the PC 3, the connection setting is performed using the sharing function of the shared printer. The sharing function is provided by the operating system.

With the sharing function of the printer provided by the operating system, the installation of the printer is automatically initiated (S203).

The installing procedure of the printer driver is illustrated in FIG. 7 in detail. With reference to the copy list indicated in the INF file (which is stored, for example, in the FD or CD provided by the vender), the file names of the printer driver are read (S20301), and a folder containing the files is also read (S20302). At this stage, in the copy list, the files of the scanner driver are indicated as well as the files of the printer driver, and the names of the files of both drivers are obtained. Then, the files are copied from the printer driver folder of the PC 2 to a printer driver folder of the PC 3 (S20303). With this procedure, the files of the scanner driver are copied in the printer driver folder of the PC 3 together with the printer driver files.

When the installation of the printer driver is finished (S203), as shown in FIG. 6, initialization of the printer driver is executed (S204). The initialization of the printer driver is as shown in FIG. 8, which is described when the initialization of the printer driver in the PC 2 is described.

That is, the initialization procedure is initiated (S20401), and a setting operation including the registration with the system of the PC 3 is executed (S20402). Then, with respect to the files of the scanner driver copied in the printer driver folder, the initialization of the scanner driver is executed. Since the files of the scanner driver include the files of the scanner driver for the host device and the files of the scanner driver for the client device, whether the terminal device (i.e., PC 3) is the host device or client device is determined (S20403). When the terminal device is the host device (S20403: YES), the scanner driver files for the host device are copied from the printer driver folder to the TWAIN folder (S20405). Since the PC 3 is the client (S20403: NO), the scanner driver files for the client is copied from the printer driver folder of the PC 3 to the TWAIN folder of the PC 3 (S20405). The scanner driver for the client device functions as the RPC client, and thus, is able to use the scanner function, which is provided by the scanner driver of the host device as the RPC server. It should be noted that, when necessary, a registration of the scanner with the system of the PC 3 including the setting of the registry may be executed (S20406). With the above procedure, in the initialization procedure of the printer driver, the initialization of the scanner driver is also executed.

When the initialization of the printer driver is finished (S204), the operating system executes a setting for using the printer function of the MFP 1 as the shared printer (S205). As a result, on the PC 3, the printer function and the scanner function of the MFP 1 can be used.

Figure 9:
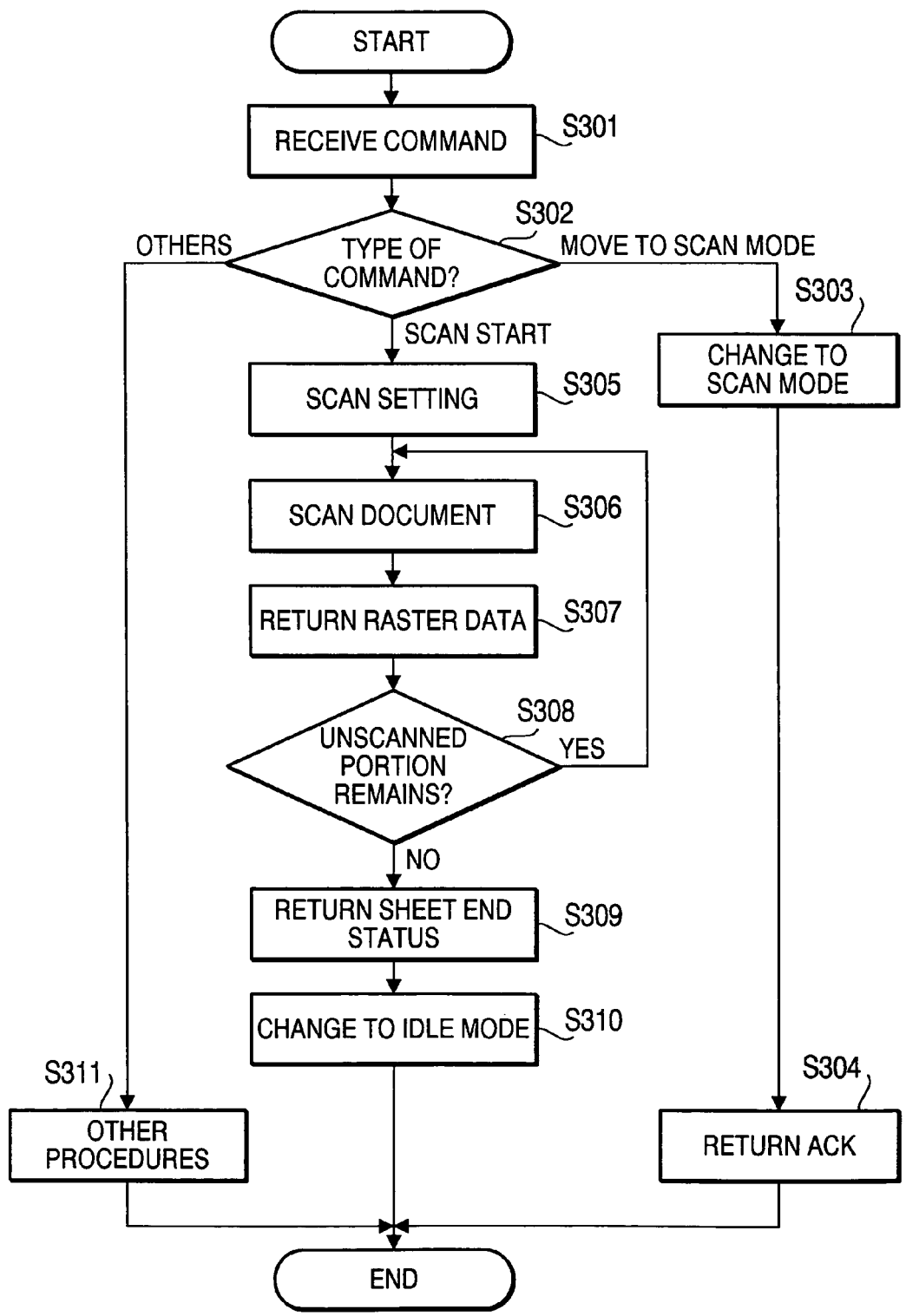
FIG. 9 shows a flowchart illustrating a control of an MFP at a terminal device.
Figure 10:
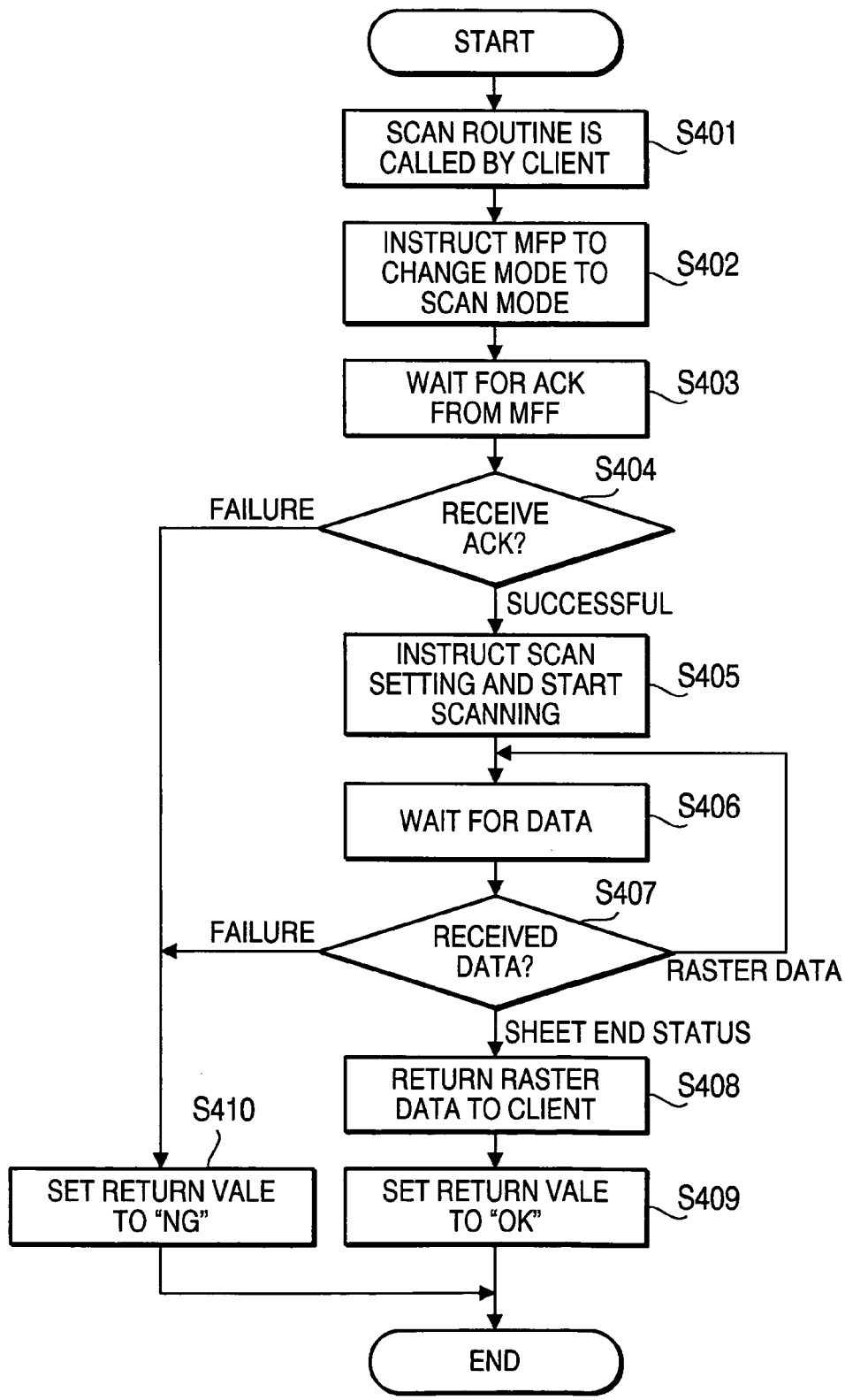
FIG. 10 shows a flowchart illustrating a scanning procedure executed in an MFP.
Figure 11:
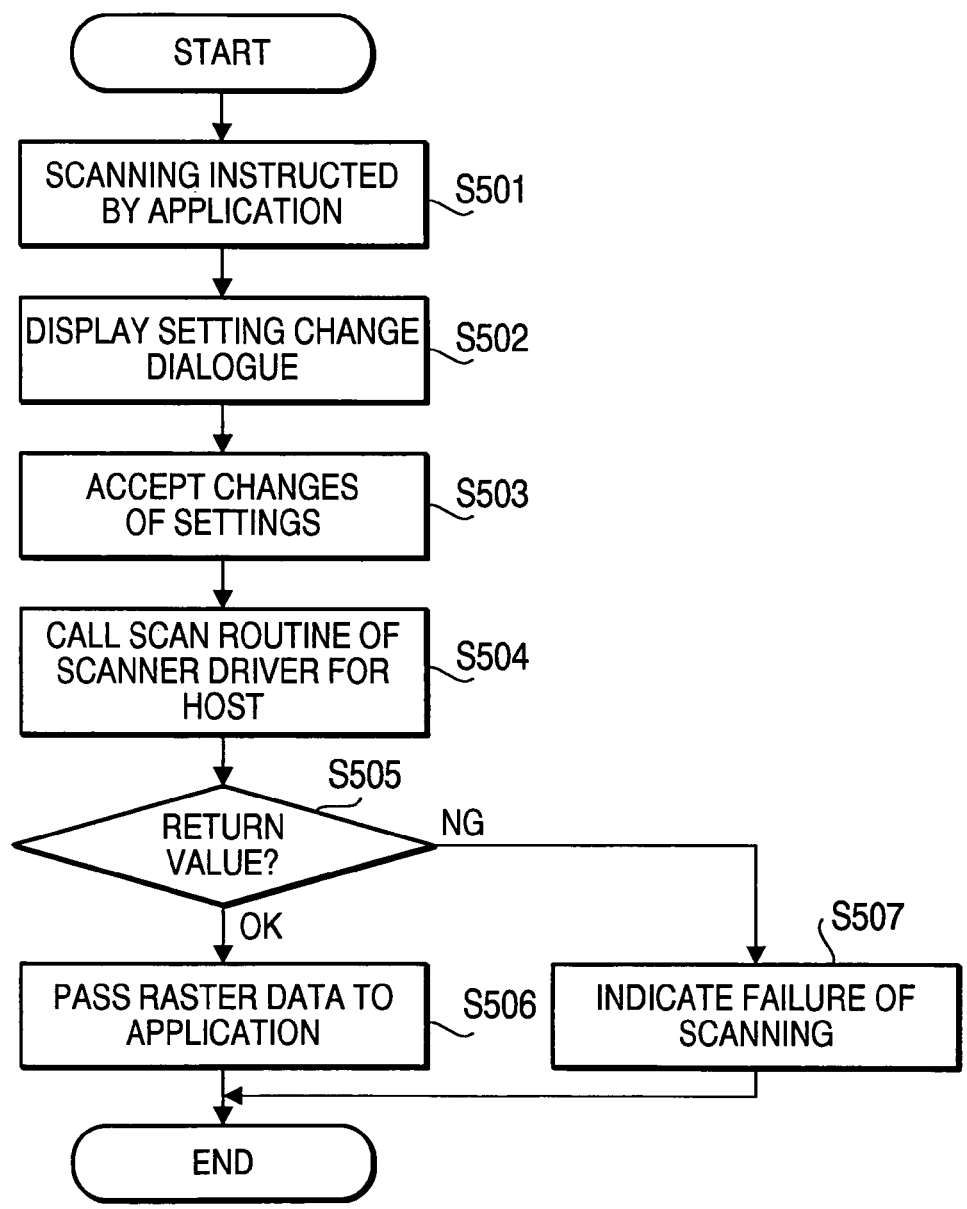
FIG. 11 shows a flowchart illustrating a scanning operation executed In the server.

Next, a procedure for carrying out the scanner function will be described with reference to FIGS. 9 thorough 11. FIG. 9 shows a flowchart illustrating a scanning procedure executed in the MFP 1. FIG. 10 is a flowchart illustrating a scanning procedure of the scanner driver on the first terminal device (i.e., PC 2), which is the host device. FIG. 11 is a flowchart illustrating a scanning procedure of the scanner driver executed on the second terminal device (i.e., the PC 3) which is the client device.

Firstly, the scanning procedure illustrating in FIG. 9 will be described.

When a command from the host device (i.e., the PC 2) is received in S301, the CPU 10 of the MFP 1 analyzes the type of the received command (S302).

When the command is an instruction to move to a scan mode (S302: move to scan mode), the operation mode of the MFP 1 is changed to the scan mode (S303), and the MFP 1 returns an ACK (ACKnowledgement) signal indicating to confirm data reception/transmission to the PC 2 (S304), and the processing of the received command is finished.

When the command is an instruction to start the scanning operation (S302: start scanning), a setting operation for the scanning operation (setting of the resolution, thickness density and other parameters) is executed (S305), and the scanning is started (S306). The scanned image data, which is typically raster data, is transmitted to the PC 2 in S307. In this embodiment, the scanning is executed line by line.

In S308, it is determined whether there remains an unscanned portion of the original (S308). When it is determined that there remains the unscanned portion (S308: YES), control returns to S306 to continue the scanning operation. When it is determined that there remains no unscanned portion (S308: NO) a sheet end status, indicative of the end of scanning, is transmitted to the PC 2 (S309). Thereafter, the operation mode of the MFP 1 is changed to the idle mode (S310) and the processing for the received command is finished.

When the command indicates any other processing (S302: other processing) the other processing corresponding to the received command is executed (S311), and the command processing is terminated.

Next, the scanning operation executed on the first terminal device (i.e., the PC 2) using the scanner driver installed therein will be described with reference to FIG. 10.

As shown in FIG. 10, when a scan routine is called from the second terminal device (i.e. PC 3) using the RPC (Remote Procedure Call) (S401), the PC 2 instructs the MFP 1 to change the operation mode to the scan mode (S402), and waits for reception of the ACK signal from the MFP 1 until a time out period within which the ACK signal is expected to be received expires (S403).

When the PC 2 receives the ACK signal from the MFP 1 within a time out period (S404: successful), the PC 2 transmits a command instructing the MFP 1 to execute the scan setting and to start the scanning (S405), and waits for reception of the data transmitted from the MFP 1 (S406). As described above, when such a command is transmitted to the MFP 1, steps S305-S310 in FIG. 9 are executed in the MFP 1.

When the PC 2 receives the raster data as the transmitted data from the MFP 1 (S407: raster data), control returns to S406 and continue receiving the data, which is being transmitted from the MFP 1 on a line basis. When the PC 2 receives the sheet end status as the data transmitted from the MFP 1 (S407: sheet end status), the PC 2 returns the raster data to the PC 3 (S408), and sets a return value to be sent to the PC 3 to "OK" (S409). If the PC 2 does not receive data for a certain period of time (S407: failure), the return value of the scan routine to be sent to the PC 3 is set to "NG" (S410), and terminates the scan routine.

It should be noted that, if the PC 2 does not receive the ACK signal from the MFP 1 within the time out period (S404: failure), it also sets the return value of the scan routine to the PC 3 to "NG" (S1410) and terminates the scan routine.

Next, the scanning operation executed in the second terminal device (i.e., the PC 3) using the scanner driver installed therein will be described with reference to FIG. 11.

As shown in FIG. 11, when the scanning is instructed by the application (S501), the CPU 30 controls the display unit 34 to display a parameter setting dialogue (S502) in order to allow the user to change the settings (S503). Then, using the RPC, carrying the changed setting parameters as arguments, a scan routine of the scanner driver of the host device (i.e., the scanning procedure by the scanner driver of the second terminal device which is the host of the MFP) is called (S504).

When the return value of the scan routine of the PC 2 (see FIG. 10) is "OK" (S505: OK), the raster data transmitted from the PC 2 is passed to the application (S506), and the scanning operation in response to the instruction by the application is finished. When the return value received from the PC 2 is "NG" (S505: NG), the CPU 30 notifies the failure of the scanning operation to the application (S507) and the scanning operation in response to the instruction by the application is finished.

Figure 12:
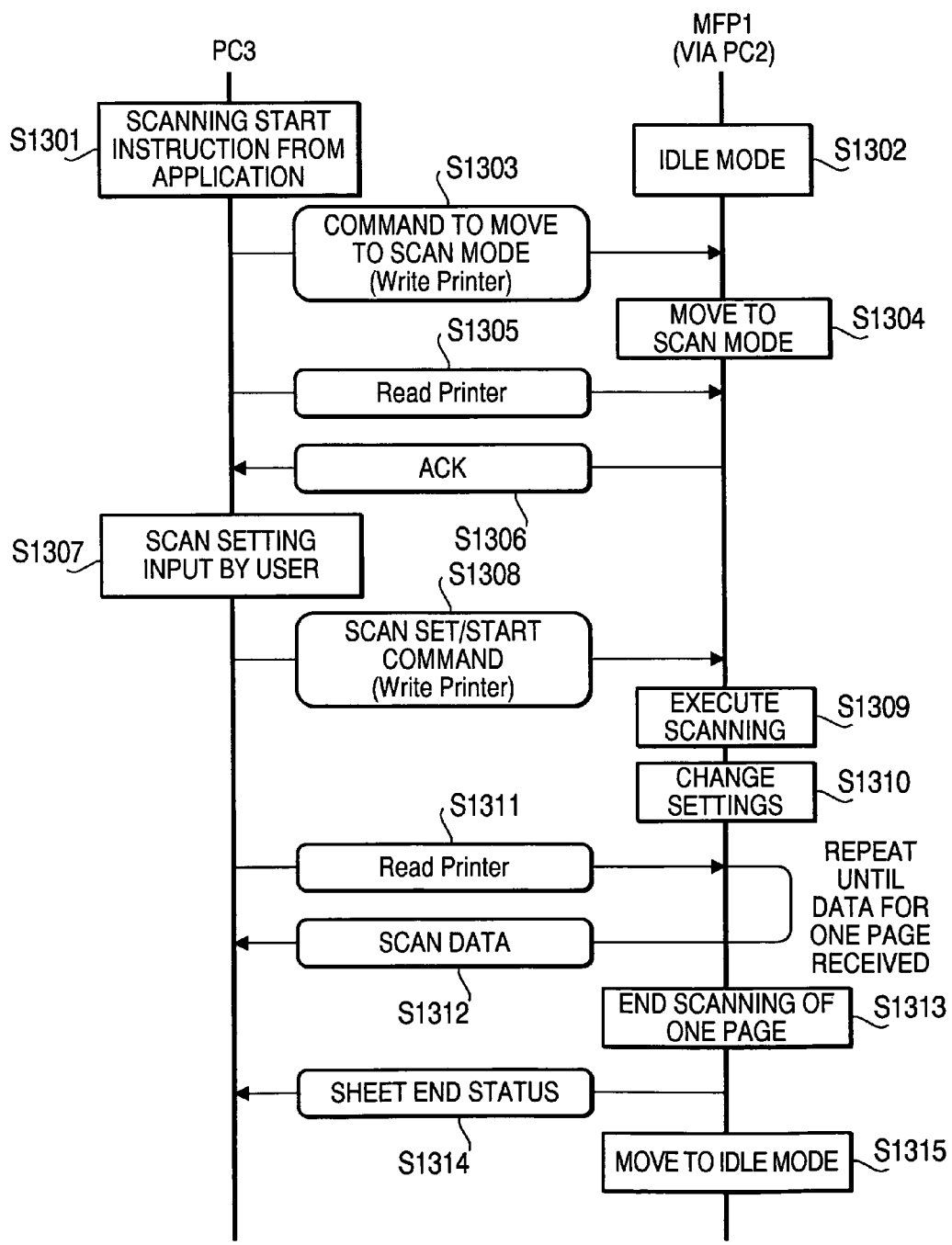
FIG. 12 shows a flowchart illustrating a scanning operation executed in the client.

Next, an example of operation sequence of the PC3 and MFP 1 will be described with reference to FIG. 12.

When the scan start command is issued by the application in the PC 3 (S1301), the TWAIN driver 3c of the PC 3 calls the WritePrinter (API for the printer), which is transmitted to the MFP 1 as the scan mode moving command (S1303). At this stage, in this example, the MFP 1 operates in the idle mode (S1302). The MFP 1 changes it operation mode to the scan mode upon receipt of the scan mode moving command (S1304).

The TWAIN driver of the PC 3 calls the. ReadPrinter (API for the printer) in order to obtain the. ACK signal from the MFP 1 (S1305). Next, the MFP 1 transmits the ACK signal to the PC 3 through the PC 2 (S1306). When the ACK is received, the PC 3 operates to accept the scan setting input by the user (S1307).

When the TWAIN driver 3c of the PC 3 accepts the scan setting input, the TWAIN driver 3c calls the WritePrinter, which is the API for the printer as the command for scan setting and starting and transmits the command to the MFP 1 through the PC 2 (S1308). When the MFP 1 receives the scan setting and starting command is received, the MFP 1 changes the settings in accordance with the received data (S1309), and executes the scanning operation (S1310).

The TWAIN driver 3c of the PC 3 calls the ReadPrinter, which is the API for the printer, in order to receive the scan data from the MFP 1 through the PC 2, and waits for the response from the MFP 1 (S1311). In response to the ReadPrinter (API), the MFP 1 transmits the scan data to the PC 3 through the PC 2 (S1312). The steps S1311 and S1312 are repeated until the data for one page of the original is scanned and transmitted.

After the scanning for one page is finished (S1313), the MFP 1 transmits the sheet end status (S1314), and changes its operation mode to the idle mode (S1315).

As above, according to the first embodiment by providing the INF file to the first terminal device, or the PC 2, and by executing the connection setting of the MFP 1 connected to the PC2 from the second terminal device, or the PC 3, with use of the printer sharing function provided by the operating system, the scanner driver is also installed when the printer driver is installed from the PC 2 to the PC 3 (S203 of FIG. 6), and the initialization of the scanner driver is executed as well as the initialization of the printer driver (S204 of FIG. 6).

As a result, it is possible to eliminate a procedure for manually installing the scanner drier in the PC 3. Further, even from the PC 3, by calling the scan routine of the PC 2 using the RPC, the scanner function of the MFP 1 connected to the PC 2 can be utilized easily (FIGS. 9-11).

It should be noted that there are scanner drivers for the host device and for the client device which are different from each other. According to the above-described embodiment, it is possible to select the appropriate scanner driver in the initialization procedure of the printer driver (see FIG. 8).

It should be noted that the above-described exemplary embodiment can be modified in various ways without departing from the scope of the invention.

For example, the MFP 1 according to the first embodiment has functions of the printer and the scanner. This is only an exemplary configuration, and the MFP may have functions of the facsimile and scanner, or the functions of the printer, or telephone and facsimile. Of course, the MFP may have additional functions as well as the above functions.

When the scanning operation is executed, the scan routine of the PC 2 is called from the PC 3 using the RPC. However, the invention need not be limited to such a configuration, and the communication between the host computer PC 2 and the client computer PC 3 when the scanning operation is executed may be performed using the Named Pipe or TCP/IP.

As described above, according to the above-described procedures, the commands related to the function of the scanner, scanning start command, and request for scanned result are transmitted using the program interface provided by the operating system (i.e., the API when the operating system is Windows®), thereby the transmission/reception path of the printer function is used for the scanner function. Thus, without performing a relatively troublesome setting for the scanner function, the scanner can be controlled.

Further, the command for executing the scanning and the command for receiving the scanning result are transmitted using the program interface for writing data in the printer (i.e., WritePrinter, which is the API for the printer, when the operating system is Windows®) and the program interface for reading data from the printer (i.e., ReadPrinter, which is the API for the printer, when the operating system is Windows®), respectively (S102, S103, S107 and S108). Thus, the function of the scanner is made disguise the printer function on a device class and the transmission/reception path of the printer is utilized for the scanner function. Therefore, without the troublesome settings, the scanner can be controlled easily.

Further to the above, as the transmission/reception path of the scanner function, the Named Pipe can be used.

As a result, even if the operating system installed in the terminal device does not support the bi-directional communication between the spooler and MFP, the reading command can be transmitted to the scanner, and the scanning result can be received from the scanner using the Named Pipe.

Furthermore, the electronic device MFP 1 is connected to the network through the PC 2 which functions as a server, in the first embodiment. However, the configuration need not be limited to the exemplified one. For example, the electronic device may be directly connected to the network. In such a case, the electronic device may have functions of the spooler, language monitor which is provided in the PC 2 in the above-described example (see FIG. 3). Further, in the terminal device, the settings for the printer (i.e., the first function) should be made.

Second Embodiment

Figure 13:
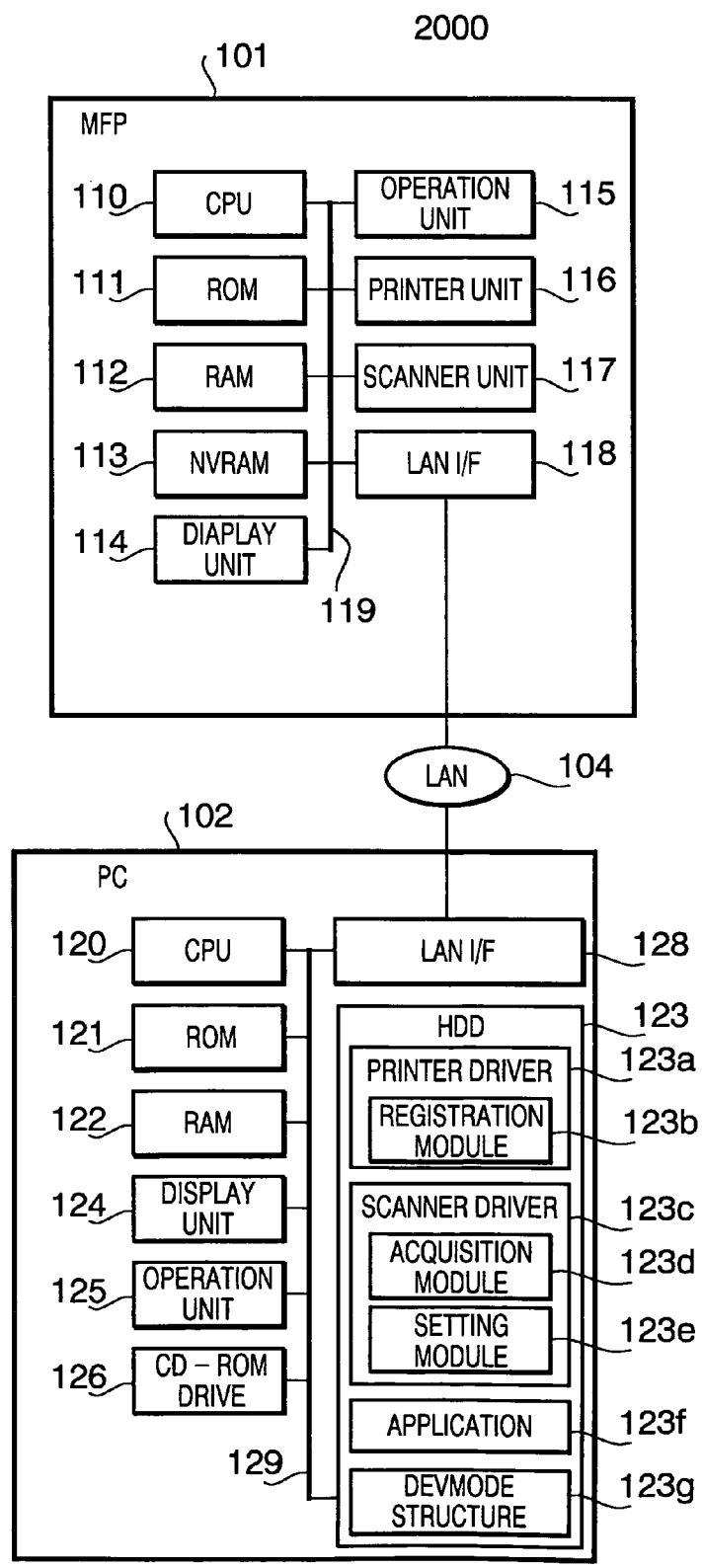
FIG. 13 shows a chart showing an operation sequence of the client and the MFP.
Figure 14:
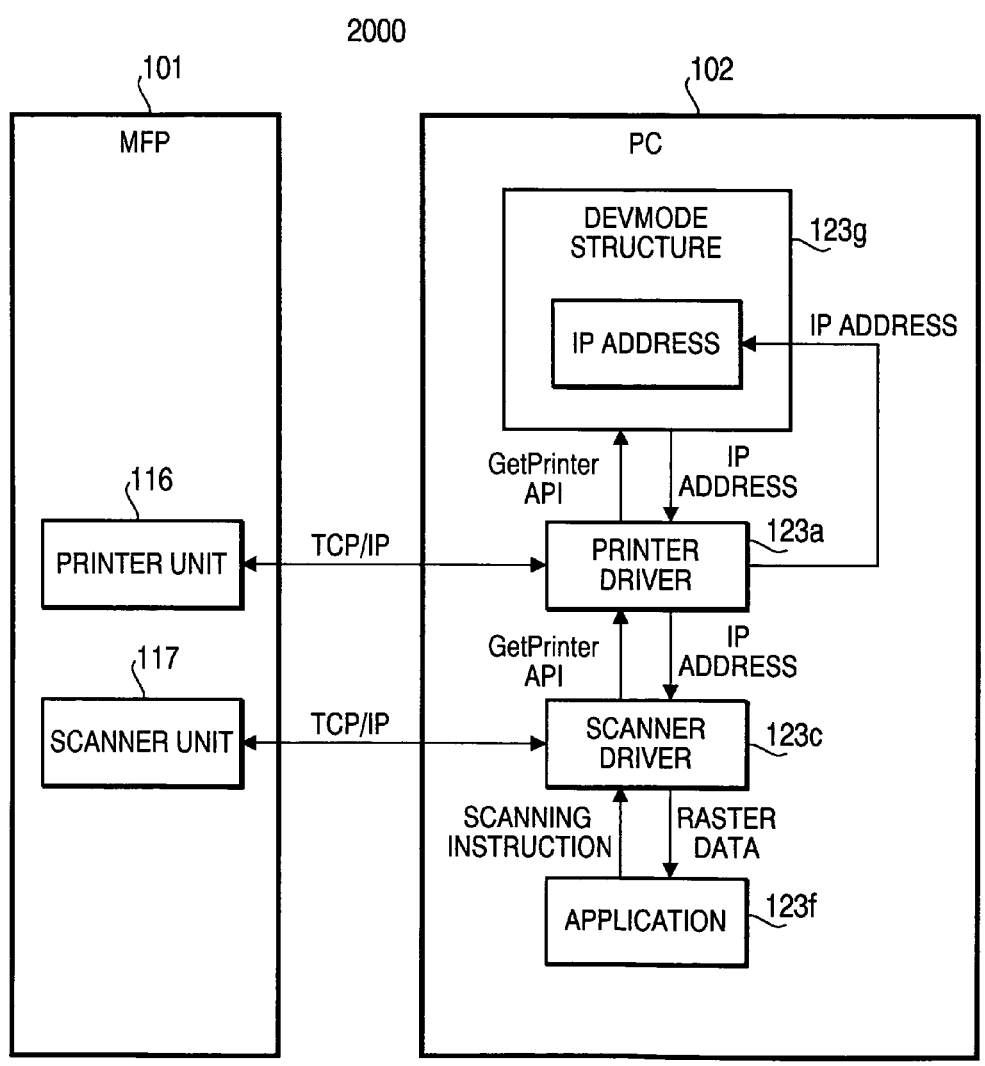
FIG. 14 is a chart illustrating data flow of the driver setting system shown in FIG. 13.

FIG. 13 is a block diagram schematically showing a configuration of a driver setting system 1000 according to a second embodiment of the invention. FIG. 14 is a chart illustrating data flow of the driver setting system 1000 shown in FIG. 13. FIG. 15 schematically shows a DEVMODE structure 123g.

The driver setting system 1000 shown in FIG. 13 includes an MFP 101 and a PC 102, which is a terminal device. The MFP 101 has a printer function as a first function, and a scanner function as a second function thereof. The MFP 101 and the PC 102 are connected through a LAN 104.

As shown in FIG. 13, the MFP 101 includes a CPU 110, a ROM 111, a RAM 112, an NVRAM 113, a display unit 114, an operation unit 115, a printer unit 116, a scanner unit 117 and a LAN interface (LAN I/F) 118, which are interconnected through a system bus 119. In the following description, the printer function will be occasionally referred to as a first function, and the scanner function will be occasionally referred to as a second function.

The CPU 110 controls an entire operation of the MFP 101. The CPU 110 analyses commands transmitted form the PC 102, and performs various operations in accordance with the commands (e.g., to control the scanner unit 117 to provide the scanner function, or to control the printer unit 116 to provide the printer function).

The ROM 111 is a read-only storage, and provides a part of a main memory space utilized by the CPU 110. The RAM 112 is a readable/writable volatile storage which also provides a part of the main memory space for the CPU 110 similar to the ROM 111. The NVRAM 113 is a non-volatile RAM that stores data to be rewritten.

The display unit 114 includes a display device (e.g., a liquid crystal display) for displaying data to be output. The display unit 114 is connected to the system bus 119 through an input/output (I/O) interface (not shown). The display unit 114 is used for displaying data related to the functions of the MFP 101 such as the printing information.

The operation unit 115 is an input device provided to the MFP 101 for accepting operation by a user. The operation unit 115 is also connected to the system bus 119 through a not-shown I/O interface. The operation unit 115 is used for inputting data related to respective functions of the MFP 1. The operation unit 115 includes for example keyboard provided with a predetermined number of depression switches.

The printer unit 116 is a device provides a printer function f or printing monochromatic or color characters and/or images. The printer unit 17 is connected to the system bus 119 through the I/O interface (not shown). The printer unit 116 prints the print data transmitted by the PC 102 in accordance with the command of a printer driver 123a of the PC 102 (see FIG. 16).

The scanner unit 117 includes a device that provides a scanner function for reading image formed on a sheet of paper or film. The scanner unit 117 is connected to the system bus 119 through a not-shown I/O interface. The scanner unit 117 executes a scanning operation, in accordance with a command from the CPU 11, to scan an image formed on an original set to the MFP 101 and generate scan data (raster data), which is transmitted to the PC 102.

The LAN interface 118 is used for connecting the MFP 101 to an LAN I/F 128 of the PC 102 through the LAN 104 so as to enable data communication between the PC 102 and the MFP 101. The LAN interface 118 is used for transmitting or receiving operation commands, scan data and print data.

The PC 102 includes a CPU 120, a ROM 121, a RAM 122, an HDD (Hard Disk Drive) 123, a display unit 124, an operation unit 125, a CD-ROM drive 126, the LAN interface (I/F) 128, which are interconnected through a system bus 129.

It should be noted that the PC 102 is installed with an operating system (OS) having a printer sharing function, and settings for using the printer function provided by the MFP 101 as a shared printer are made.

The CPU 120 controls the entire operation of the PC 102. Further the CPU 120 transmits a scanning start command, print start command, and various other commands to the MFP 101. The CPU 120 is capable of selecting and executing a printer driver 123a and scanner driver 123c from the HDD 123, when necessary.

The ROM 121 is a read-only storage, and function as a part of a main memory space used by the CPU 120. The ROM 121 stores a program for starting up the operating system of the PC 102. The RAM 122 is a readable/writable volatile storage, which also serves as a part of the main memory space of the CPU 120. The HDD 123 is a readable/writable storage (i.e., the hard disk) and its drive. The HDD 123 stores the printer driver (i.e., a first drier) 123a, the scanner driver (i.e., a second driver) 123c, application 123f and DEVMODE structure 123g, which will be described in detail later. The HDD 123 also stores print data to be transmitted to the MFP 101, and the raster data transmitted from the MFP 101.

The printer driver 123a is installed in the PC 102 by the user. The printer driver 123a includes a registration module 123b. As shown in FIG. 14, during the setup procedure of the printer driver 123a executed in accordance with a procedure provided by the OS, an IP address input by the user is written in the DEVMODE structure 123g by the registration module 123b.

The scanner driver 123c is installed in the PC 102 by the user. The scanner driver 123c includes an acquisition module 123d and a setting module 123e.

The acquisition module 123d reads out the IP address of the MFP 101 written in the DEVMODE structure 123g through the printer driver 123a, using a GetPrinter API, when the setup of the scanner driver 123c is started as triggered by an instruction to start scanning by the application 123f, as shown in FIG. 14.

The setting module 123e sets the IP address of the MFP 101, which is read out with the acquisition module 123d, as data related to the MFP 101 as the setup process of the scanner driver 123c is executed.

The application 123f is installed in the PC 102 by the user. The application 123f instructs the printer driver 123a to execute the printing operation or instructs the scanner driver 123c to execute the scanning operation. The application 123f may include various types of software.

The DEVMODE structure 123g holds data related to the initialization of devices and printer circumstances. An example of the DEVMODE structure 123g is indicated in FIG. 15. The DEVMODE structure 123g is provided with an enhanced area (a private area) which can be enhanced by a vendor providing driver software. The enhanced area of the DEVMODE structure 123g is defined by setting a value other than zero, e.g., 128*sizeof(BCHAR), to "WORD dmDriverExtra" in the structure shown in FIG. 15. Then, as a value of "BCHAR Device Address[128]" provided in the enhanced area the IP address input in the setup procedure of the printer driver 123a is written using the registration module 123b of the printer driver 123a.

The display unit 124 is a device for outputting information by displaying the same. The display unit 124 is connected to the system bus 129 through an I/O interface (not shown). The display unit 124 is used for displaying data related to respective functions of the PC 102. The display unit 124 includes, for example a CRT (cathode ray tube) display or an LCD (liquid crystal display).

The operation unit 125 is an input device provided to the PC 102 for allowing a user to input various command. The operation unit 125 is connected to the system bus 129 through a not-shown I/O interface. The operation unit 125 is used for inputting various data related to the functions of the PC 102. The operation unit 125 typically includes a mouse and a keyboard.

The CD-ROM drive 126 is a device for reading data stored in a CD-ROM, and is connected to the system bus 129 through a not-shown I/O interface. It should be noted that the CD-ROM 126 may be replaced with an FD (floppy disk) drive or a MO (magneto-optical disk) drive.

The LAN interface 128 is connected to the LAN interface 118 through the LAN 104, and enables data communication (e.g., communication of the raster data and print data) between the PC 102 and the MFP 101.

Next, setup procedures of the printer driver and the scanner driver will be described with reference to FIGS. 16 through 18.

FIG. 16 shows a flowchart illustrating the setup procedure when the user installs the printer driver 123*a* in the PC 102. The setup of the printer driver 123*a* is initiated in accordance with the function of the OS (Windows® in this embodiment) in S2101.

In S2102, the user is required to input device information. The device information represents the information related to the MFP 101 connected to the terminal device. That is, according to the second embodiment, the device information includes the IP address of the MFP 101 connected to the PC 102.

When the user inputs the device information, at least a part of the device information (the IP address of the MFP 101, in this embodiment) is temporarily stored in the RAM 122. Thereafter, in accordance with the function of the OS (i.e. Windows®), a normal setup procedure continues (S2103).

When the normal setup procedure is finished, an area for storing a default DEVMODE structure 123*g* of the printer driver 123*a* is defined in the HDD 123. Then, in accordance with the procedure executed by the registration module 123*b*, at least a part of the device information (i.e., the IP address of the MFP 101), which was stored in the RAM 122, is written in the enhanced area of the DEVMODE structure 123*g* (S2104). Then, the setup procedure shown in FIG. 16 is finished.

FIG. 17 shows a flowchart illustrating a status changing procedure of the printer driver 123*a*.

As shown in FIG. 17, after the setup of the printer driver 123*a* is finished, when an event is initiated as the user provokes a procedure of the printer driver 123*a* in the PC 102 in accordance with the function of the OS (S2201), it is determined whether the event is a status changing event (S2202). The status changing event is en event for changing the device information having been input by the user.

When the event is not the status changing event (S2202: NO), a procedure corresponding to the occurred event is executed in accordance with the function of the OS (S2204), and the procedure of the printer driver 123*a* is finished.

When the event is the status changing event (S2202: YES) the registration module 123*b* of the printer driver 123*a* writes the at least a part of the device information changed by the user (i.e., the IP address of the MFP 101) in the enhanced area of the DEVMODE structure 123*g* (S2203). Then, in accordance with the function of the OS, a normal event processing is executed (S2204) and the procedure of the printer driver 123*a* is finished.

Next, a procedure executed by the scanner driver will be described with reference to FIG. 18.

As shown in FIG. 18, when the scanning operation is instructed by the application 123*f* (S2301), the setup of the scanner driver 123*c* is started (S2302).

In the setup of the scanner driver 123*c*, the acquisition module 123*d* reads out, as the device information, the IP address of the MFP 101 written by the registration module 123*b* from the enhanced area of the DEVMODE structure 123*g* through the printer driver 123*a*, using the GetPrinter API (S2303).

It should be noted that the IP address read out from the enhanced area of the DEVMODE structure 123*g* by the acquisition module 123*d* is the IP address written at the setup of the printer driver 123*a* if the status changing event has not occurred, and the IP address as written at the status change of the printer driver 123*a* if the status changing event has occurred.

Next, the setup procedure of the scanner driver 123*c* is executed, in which the setting module 123*e* sets the IP address of the MFP 101 as the device information (S2304). Then, the normal setup procedure of the scanner driver 123*c* is executed (S2305). When the setup procedure of the scanner driver 123*c* is finished, a procedure for the scanning instruction is executed. In this procedure, firstly, a scan command is transmitted to the MFP 101 designated by the device information set to the scanner driver 123*c* (S2306). Then, until the last line is scanned (S2308: YES), raster data for 1 line is repeatedly received from the MFP 101 designated by the device information set to the scanner driver 123*c* (S2308: NO; S2307).

When the raster data for the last line is received (S2308: YES), the entire raster data is transmitted to the application 123*f* (S2309), and the procedure of the scanner driver 123*c* is finished.

As above, according to the second embodiment, at least a part of the information of the MFP 101 regarding the printer driver 123*a* set by the user using the printer driver 123*a* is reflected as the information of the MFP 101 regarding the scanner driver 123*c* (S2104 of FIG. 16, S2203 of FIG. 17 and S2303 of FIG. 18).

As a result, a troublesome operation for setting the same information (e.g., the IP address) regarding the MFP 101 for each of the printer driver 123*a* and the scanner driver 123*c* can be avoided.

Further, when the scanner function is used, every time the application 123*f* issues the scan command and the scanner driver 123*c* is executed, at least a part of the information related to the MFP 101 (e.g., the IP address) which was set by the user with the printer driver 123*a* is used as the information related to the MFP 101 when the scanner driver 123*c* is executed (S2301 through S2304 of FIG. 18). As a result, if the user changes the information related to the MFP 101 with respect to the printer driver 123*a* (S2202 through S2203 of FIG. 17), the latest information of the MFP 101 with respect to the printer driver 123*a* can be set as the information of the MFP 101 with respect to the scanner driver 123*c*.

According to the second embodiment, the MFP 101 has the printer function (the printer unit 116) and the scanner function (the scanner unit 117). Windows® generally supports the settings of the printer driver 123*a* by the user, by making use of the information regarding the MFP 101 set by the user with the printer driver 123*a*, a troublesome setting operation of the MFP 101 regarding the scanner driver 123*c* can be omitted.

Third Embodiment

Next, a driver setting system 2000 according to the third embodiment will be described with reference FIGS. 19 and 20. FIG. 19 schematically shows a configuration of the driver setting system 2000 according to the third embodiment, and FIG. 20 schematically shows data flow of the driver setting system according to the third embodiment.

In the example shown in FIG. 19, the driver setting system 2000 includes an MFP 201, a PC 202 and a PC 203.

The MFP 201 has a first function of a printer and a second function of a scanner. The MFP 201 and the PC 202 are connected through a LAN 204. Further, the MFP 201 is connected to the PC 202, and the PC 202 and PC 203 are interconnected through the LAN 204. In this embodiment, the PC 202 functions as the server computer, and the PC 203 functions as the client computer.

As shown in FIG. 19., the MFP 201 has a CPU (Central Processing Unit) 210, a ROM (ReadOnly Memory) 211, aRAM (Random Access Memory) 212, an NVRAM (Non Volatile RAM) 213, a display unit 214, an operation unit 215, a printer unit 216, a scanner unit 217 and a PC interface (PC I/F) 218, which are interconnected through a system bus 219. The CPU 210, ROM 211, RAM 212, NVRAM 213, display unit 214 and operation unit 215 are similar to the CPU 110, ROM 111, RAM 112, NVRAM 113, display unit 114 and operation unit 115 of the MFP 101 of the third embodiment, and thus the description thereof will not be repeated.

The printer unit 216 is a device provides a printer function for printing monochromatic or color characters and/or images. The printer unit 216 is connected to the system bus 219 through the I/O interface (not shown). The printer unit 216 prints the print data transmitted by the PC 202 or from PC 203 through the PC 202, in accordance with the command by the CPU 210.

The scanner unit 217 includes a device that provides a scanner function for reading image formed on a sheet of paper or film. The scanner unit 217 is connected to the system bus 219 through a not-shown I/O interface. The scanner unit 217 executes a scanning operation, in accordance with a command from the CPU 210, to scan an image formed on an original set to the MFP 211 and generate scan data (raster data), which is transmitted to the PC 202 or to the PC 203 via the PC 202.

The PC interface 218 is used for connecting the MFP 201 to an MFP I/F 228 of the PC 202 so as to enable data communication between the PC 202 and the MFP 201. The PC interface 218 is used for transmitting or receiving operation commands, scan data and print data.

The PC 202 includes a CPU 220, a ROM 221, a RAM 222, an HDD (Hard Disk Drive) 223, a display unit 224, an operation unit 225, a CD-ROM drive 226, a LAN interface (I/F) 227 and the MFP I/F 228, which are interconnected through a system bus 229.

It should be noted that the PC 202 is installed with an operating system (e.g., Windows®) having a printer sharing function, and settings for using the printer function provided by the MFP 201 as a shared printer are made.

The CPU 220 controls the entire operation of the PC 202. Further, the CPU 220 transmits a scanning/printing start command to the MFP 201. The CPU 220 selectively retrieves appropriate one of the printer driver 223a for the server or the scanner driver 223c of the server from the HDD 223, and executes the retrieved driver.

The ROM 221 is a read-only storage, and function as a part of a main memory space used by the CPU 220. The ROM 221 stores a program for starting up the operating system of the PC 202. The RAM 222 is a readable/writable volatile storage, which also serves as a part of the main memory space of the CPU 220.

The HDD 223 is a readable/writable storage (I.e., the hard disk) and its drive. The HDD 223 stores the printer driver for the server 223a, the scanner driver for the server 223c, the DEVMODE structure 223g, print data to be transmitted to the MFP 201, and raster data generated and transmitted by the MFP 201.

The printer driver 223a for the server is installed in the PC 202 by the user. The printer driver 223a writes a host computer name, to which the MFP 201 is connected, input by the user in the DEVMODE structure 223g during the setup procedure of the printer driver 233a for the client, which is executed by the registration module 223b of the printer driver 223a in accordance with the OS of the PC 203 using the RPC (Remote Procedure Call) function.

The printer driver 223a for the server reads out the host computer name and the name of the Named Pipe using the GetPrinter API of the acquisition module 233d of the PC 203, in accordance with the RPC function. When the GetPrinter API is called, the printer driver for the client returns the DEVMODE whose enhanced area (described later) is updated such that the Device Address is set. The DEVMODE is the DEVMODE structure 223g stored in the server PC 202 using the RPC function.

The scanner driver 223c for the server is installed in the PC 202 by the user. The scanner drive 223c has, as shown in FIG. 22, a function of the Named Pipe server, and communicates with the scanner driver 223c which is the Named Pipe client using the Named Pipe.

The DEVMONDE structure 223g contains information regarding the initialization of the device and printer environment, the structure of which is similar to that shown in FIG. 17. The DEVMODE structure 223g has, similarly to the third embodiment, an enhanced area (private area) which can be enhanced by the vender of the driver software. The enhanced area of the DEVMODE structure 223g can be defined by setting a value other than zero (e.g., 128*sizeof(BCHAR)) as a value of the "WORD dmDriverExtra" shown in FIG. 15. Then, as the value of the "BCHAR DeviceAddress [128] set as the enhanced area, the host computer name to which the MFP 201 is connected and is input during the setup of the printer driver 233a for the client is written by the registration module 233b of the printer driver 233a, through the printer driver 223a for the server using the RPC function.

The display unit 224, operation unit 225 and the CD-ROM drive 226 are similar to the display unit 124, operation unit 125 and the CD-ROM driver 126, respectively, and accordingly, the description thereof will not be repeated.

The LAN interface 227 is used for connecting the PC 202 with a LAN interface 237 of the PC 203 through the LAN 204. The LAN interface 227 enables data communication between the PC 202 and the PC 203. The LAN interface 227 is used for transmitting or receiving the scan data and the print data.

The MFP interface 228 is a general use interface such as the LPT, and connects with the PC interface 218 of the MFP 201 so as to enable data communication between the PC 202 and the MFP 201. The MFP interface 228 is used for transmitting or receiving operation commands scan data and print data.

The PC 203 includes a CPU 230, a ROM 231, a RAM 232, an HDD 233, a display unit 234, an operation unit 235, a CD-ROM drive 236 and the LAN interface 237, which are interconnected through a system bus 239.

The CPU 230 controls the entire operation of the PC 203. Further, the CPU 230 transmits the scanning start command to the MFP 201 through the PC 202 by executing application 233f. The CPU 230 can also selectively retrieve the printer driver 233a or the scanner driver 233c from the HDD 233, and execute the same.

The ROM 231 and the RAM 232 are similar to the ROM 221 and the RAM 222 of the PC 202, and the description thereof is omitted.

The HDD 233 is a readable/writable storage (i.e., a hard disk) and a reading/writing device thereof. The HDD 233 stores the printer driver 233a, the scanner driver 233c, application 233f, print data to be transmitted to the MFP 201 through the PC 202 and the raster data transmitted from the MFP 201 through the PC 202.

As the PC 202 is implemented with a sharing function with respect to the printer function of the MFP 201, the printer driver 233a for the client is automatically installed from the PC 202, by the function of the OS.

The registration module 233b writes the host computer name input by the user in the DEVMODE structure 233g through the printer drier 223a for the server, using the RPC function, during the setup procedure of the printer driver 233a for the client which is executed in accordance with the function of the OS, as shown in FIG. 20.

The scanner driver 233c for the client is installed in the PC 203 by the user. The scanner driver 233c has an acquisition module 233d and a setting module 233e.

The acquisition module 233d reads out the host computer name of the MFP 201 written in the DEVMODE structure 223g and the name of the Named Pipe searched by the host computer name through the printer driver 233a and the printer driver 223a under the RPC function using the GetPrinter API when the setup of the scanner driver 233c is started in response to the scan command issued by the application 233f, as shown in FIG. 22.

The setting module 233e sets the host computer name of the MFP 201 as read out and the name of the Named Pipe in the setup procedure for the scanner driver 233c after the acquisition module 233d read out the host computer name of the MFP 210 and the name of the Named Pipe are read out.

The application 233f is installed by the user. The application 223f transmits a print command to the printer driver 233a for the client, and a scan command to the scanner driver 233c for the client. Various types of application software may be available.

The display unit 234, the operation unit 235, the CD-ROM drive 236 and the LAN interface 237 are similar to the play unit 224, the operation unit 225, the CD-ROM drive 226 and the LAN interface 227 of the PC 201, respectively, and accordingly, the description there of will be omitted.

The procedures of the printer driver and the scanner driver of the driver setting system shown in FIG. 21 will be described in detail with reference to FIGS. 18 through 20.

Firstly, the procedure of the printer driver 233a at the setup will be described with reference to FIG. 18.

As shown In FIG. 16, in PC 203, with the sharing function of the OS (i.e., Windows@), the printer driver 233a is installed from the PC 202, which is the server device. Then, in accordance with the function of the OS, the setup of the printer driver 233a is initiated (S2101).

In S2102, the user is required to input the device information. The device information represents the information related to the MFP connected to the terminal device. That is, according to the third embodiment, the device information includes the host computer name of the MFP 101 which is connected to the PC 202.

When the user input the device information, at least a part of the device information (e.g., the host computer name information of the MFP 101) is temporarily stored in the RAM 232. Thereafter, In accordance with the function of the OS (i.e., Windows®), a normal setup procedure of the printer driver 233a continues (S2103).

When the normal setup procedure is finished, an area for storing a default DEVMODE structure 1239 of the printer driver 223a is defined in the HDD 123. Then, in accordance with the procedure by the registration module 223b, at least a part of the device information (the host computer name of the MFP 101) is stored in the enhanced area of the DEVMODE structure 223g (S2104). Then, the setup procedure shown in FIG. 16 is finished.

Next, a status changing procedure of the printer driver 233a will be described with reference to FIG. 17.

As shown in FIG. 17, after the setup of the printer driver 233a is finished in the PC 203 the printer driver 233a is executed in the PC 203 in accordance with the function of the OS (i.e., Windows®) by the user. Thereafter, when an event is initiated (S2201), it is determined whether the event is a status changing event (S2202). The status changing event is an event for changing the device Information having been input by the user.

When the event is not the status changing event (S2202: NO), a procedure corresponding to the occurred event is executed in accordance with the function of the OS (S2204), and the procedure of the printer driver 233a is finished.

When the event is the status changing event (S2202: YES), the registration module 233b of the printer driver 233a and the printer driver 223a under the RPC function, at least a part of the device information changed by the user (e.g., the host computer name of the MFP 101) is written in the enhanced area of the DEVMODE structure 223g (S2203). Then, in accordance with the function of the OS, a normal event processing is executed (S2204) and the procedure of the printer driver 233a is finished.

Next, a procedure of the scanner driver 233c will be described with reference to FIG. 18.

As shown in FIG. 18, when the scanning operation is instructed by the application 233f (S2301), the setup of the scanner driver 233c Is started (S2302).

In the setup of the scanner driver 233c, the acquisition module 233d reads out, as the device information the host computer name of the MFP 201 and the name of the Named Pipe searched for based on the host computer name, which are written by the registration module 233b in the enhanced area of the DEVMODE structure 223g, using the GetPrinter API through the printer driver 233a and the printer driver 223a under the function of the RPC (S2303). It should be noted that, since the DEVMONDE structure 223g is under control of the printer driver 223a for the server PC 202 it can be read directly without using the API.

It should be noted that the host computer name and the name of the Named Pipe read out from the enhanced area of the DEVMODE structure 223g by the acquisition module 233d is those written at the setup of the printer driver 233a if the status changing event has not occurred, and the host computer name and the name of the Named Pipe are those as written at the status change of the printer driver 233a if the status changing event has occurred.

Next, as the setup procedure of the scanner driver 233c, the setting module 233e sets the host computer name of the MFP 201 and the name of the Named Pipe as read out as the device information (S2304). Then, the normal setup procedure of the scanner driver 233c is executed (S2305).

When the setup procedure of the scanner driver 233c is finished, a procedure for the scanning instruction is executed. In this procedure, firstly, a scan command is transmitted to the MFP 201 designated by the device information set to the scanner driver 233c by the Named Pipe, through the scanner driver 223c for the server (S2306). Then, until the last line is scanned (S2308: YES), raster data for 1 line is repeatedly received from the MFP 201 designated by the device information set to the scanner driver 233c (S2308: NO; S2307) with the Named Pipe through the scanner driver 223c for the server.

When the raster data for the last line is received (S2308: YES), the entire raster data is transmitted to the application 233f (S2309) and the procedure of the scanner driver 233c is finished.

As above, according to the third embodiment, at least a part of the information of the MFP 201 regarding the printer driver 233a (i.e., the host computer name and the name of the Named Pipe) set by the user using the printer driver 233a is reflected as the information of the MFP 201 regarding the scanner driver 233c (52104 of FIG. 18, S2203 of FIG. 19 and S2303 of FIG. 20).

As a result, a troublesome operation for setting the same information (e.g., the host computer name and the name of the Named Pipe) regarding the MFP 201 for each of the printer driver 233a and the scanner driver 233c can be avoided.

Further, when the scanner function is used, every time the application 233f issues the scan command and the scanner driver 233c is executed, at least a part of the information related to the MFP 201 (e.g. the host computer name and the name of the Named Pipe) set by the user with the printer driver 233a is used as the information related to the MFP 201 when the scanner driver 233c is executed (S2301 through S2304 of FIG. 20). As a result, even if the user changes the information related to the MFP 201 with respect to the printer driver 233a (S2202 through S2203 of FIG. 19), the latest information of the MFP 201 with respect to the printer driver 233a can be set as the information of the MFP 201 with respect to the scanner driver 233c.

According to the third embodiment, the MFP 201 has the printer function (the printer unit 216) and the scanner function (the scanner unit 217). Windows® generally supports the settings of the printer driver 233a by the user. Accordingly, by making use of the information regarding the MFP 201 set by the user with the printer driver 233a, a troublesome setting operation of the MFP 201 regarding the scanner driver 233c can be omitted.

It should be noted that the present invention need not be limited to the above-described exemplary embodiments, and without departing from the scope of the invention, various modifications can be made.

In the second and third embodiments with the registration modules 123b and 233b, the information set by the printer drivers 123a and 233a for the MFP 101 and MFP 201 is stored in the enhanced areas of the DEVMODE structures 123g and 233g. The area where the such information is stored need not be limited to the above, but can be stored any area (e.g., the registry or INI files) which can be accessed by the scanner drivers 123c and 233c.

Hereinafter, as a modification of the third embodiment, an example using the registry instead of the DEVMODE structure will be described with reference to FIGS. 21 and 22.

FIG. 21 is a block diagram of a driver setting system according to a modification of the third embodiment, and FIG. 22 shows data flow in the driver setting system shown in FIG. 21.

As shown in FIG. 21, the HDD 123 of the PC 102 is provided with a registry 123h besides the DEVMODE structure 123g. The registry 123h is a database employed in Windows®, and contains all the setting information of the computer, including the settings of the device drivers and applications for managing the same. The registry 123h includes a private area where the vender providing device drivers can set freely.

As shown in FIG. 22, the registering module 123b of the printer driver 123a writes a name of a Port of the MFP 101 input during the setup of the printer driver 123a in the registry 123h using the SetPrinterData API.

The acquisition module 123d reads out the IP address of the MFP 101 by searching, through the printer driver 123a, the registry 123h for the Port name of the MFP 101 using the GetPrinterData API.

The setting module 123e sets the IP address of the MFP 101 as the setup procedure of the scanner driver 123c after the acquisition module 123d obtains the IP address of the MFP 101.

Alternatively, it may be possible to generate a key such as "HKEY_LOCAL_MACHINE¥SOFTWARE¥BORTHER" in the registry 123h, and the registration module 123b of the printer driver 123a writes at lease a part of the device information (e.g., the IP address or the host computer name) in the key using the RegSetValue API.

Further alternatively, an INI file can be used instead of the DEVMODE structure. For example, a file having an extension of "ini" is created in the windows directory, and the registration module 123b of the printer driver 123a writes the IP address of the MFP 101 in the INI file using the WritePrivateProfileString. In such a case, the acquisition module 123d reads out the IP address using the GetPrivateProfileString from the INI file. Then, the setting module 123e sets the thus read IP address of the MFP 101 in the setup procedure of the scanner driver 123c.

It should be noted that the information concerning the MFP 101 may be stored in the storage area accessible through the printer driver 123a (e.g., DEVMODE structure 123g), or another storage area accessible through the scanner driver 123c.

The above-described modification of the third embodiment can easily be applied to the third embodiment.

In the second and third embodiments, as the OS of the PC 102, PC 202, PC 203, Windows® is installed. However, the invention need not be limited to such PCs, and the invention is applicable to a system in which the PCs are installed with another OS, such as MAC OS®. When MAC OS® is used, as an area in which the registration modules 123b and 233b can write the information related to the MFP 101 and MFP 201 set with the printer drivers 123a and 233a, and which are accessible by the scanner drivers 123c and 233c, a resource may be used.

In the second and third embodiment, each of the MFP 101 and MFP 201 has a printer function as a first function, and a scanner function as a second function. The invention, need not be limited to such a configuration. For example, the MFP may have a facsimile function as the first function and a video capture function as the second function. With any other appropriate functions alternatively or additionally provided, the invention is applicable.

The present disclosure relates to the subject matters contained in Japanese Patent Applications No. 2002-235559, filed on Aug. 13, 2002, No. 2002-246708, filed on Aug. 27, 2002 and No. 2002-337492, filed on Nov. 21, 2002, which are expressly incorporated herein by reference in their entireties.

What is claimed is:

1. A method of installing a device driver for a system including a multifunction device having at least a first function and a second function, a first terminal device and a second terminal device, the multifunction device being connected to the first terminal device, the first terminal device and the second terminal device being connected through a network, a first device driver for the first function and a second device driver for the second function being installed in the first terminal device, the method comprising the steps of:

setting to connect the second terminal device to the multifunction device through the first terminal device with respect to the first function, the second function not being part of the first function;

installing the first device driver, which is installed in the first terminal device, in the second terminal device, the second device driver being installed in the second terminal device as a part of the first device driver; and initializing the first device driver installed in the second terminal device, the second device driver being initialized during the initialization of the first device driver.

2. The method according to claim 1, wherein the step of installing includes the steps of:

copying the first device driver from the first terminal device to a predetermined folder in the second terminal device, the second device driver being copied in the predetermined folder in the second terminal device as a part of the first device driver; and copying the second device driver to a folder, in the second terminal device, corresponding to the second function of the multifunction device.

3. The method according to claim 2, wherein the second device driver includes a second device driver for a host and a second device driver for a client, and wherein the step of installing the first device driver including the step of copying only the second device driver for the client to the folder corresponding to the second function of the multifunction device.

4. The method according to claim 1, wherein the first terminal device and the second terminal device are connected through interfaces that are different from the network through which the first terminal device and the second terminal device are connected.

5. A method of installing a device driver for a system including a multifunction device having at least a first function and a second function, a first terminal device and at least one second terminal device, the multifunction device being connected to the first terminal device, the first terminal device and the second terminal device being connected through a network, the method including the steps of:

installing a first device driver for the first function and a second device driver for the second function in the first terminal device, the second driver being installed in the first terminal device as a part of the first device driver, the second function not being part of the first function;

initializing the first driver installed in the first terminal device, the second device driver being initialized during the initialization of the first device driver;

setting to connect the at least one second terminal device to the multifunction device through the first terminal device with respect to the first function;

installing the first device driver from the first terminal device to the second terminal device, the second device driver being installed in the second terminal device as a part of the first device driver; and initializing the first device driver installed in the second terminal device, the second device driver being initialized during the initialization of the first device driver.

6. The method according to claim 5, wherein the second driver includes a second driver for a host and a second driver for a client, and wherein each of the steps of installing includes the steps of:

determining whether the terminal device in which the initializing is performed is the host or client; and selecting one of the second driver for the host or the second driver for the client to be initialized based on the determination in the step of the determining.

7. A method of installing a device driver for a system including a multifunction device having at least a first function of one of a printer and a facsimile device and a second function other than the function of the printer and the facsimile device, a first terminal device installed with an operating system provided with a sharing function of the first function, the method including the steps of:

installing, as a part of a first device driver corresponding to the first function of the multifunction device, a second device driver corresponding to the second function in the first terminal device;

initializing the first driver installed in the first terminal device, the second device driver being initialized during the initialization of the first device driver;

performing a setting, in the first terminal device, related to the sharing function of the multifunction device with respect to the first function;

setting to connect the second terminal device to the multifunction device through the first terminal device with respect to the first function in the second terminal device;

installing, from the first terminal device to the second terminal device, the second device driver as a part of the first device driver installed in the first terminal device; and initializing the second device driver installed in the second terminal device by initializing the first device driver in the second terminal device.

8. The method according to claim 7, wherein the second driver includes a second driver for a host and a second driver for a client, and wherein each of the steps of installing includes the steps of:

determining whether the terminal device in which the initializing is performed is the host or client; and selecting one of the second driver for the host or the second driver for the client to be initialized based on the determination in the step of the determining.

9. A computer-readable storage medium having a program embedded therein, the program defining, when executed by a computer, a method of installing a device driver for a system including a multifunction device having at least a first function and a second function, a first terminal device and a second terminal device, the multifunction device being connected to the first terminal device, the first terminal device and the second terminal device being connected through a network, the first terminal device being installed with a first device driver for the first function and a second device driver for the second function, the program being executed by said second terminal device, the method comprising the steps of:

setting to connect the second device to the multifunction device through the first terminal device with respect to the first function, the second function not being part of the first function;

installing the first device driver, which is installed in the first terminal device, in the second terminal device, the second device driver being installed in the second terminal device as a part of the first device driver; and initializing the first device driver installed in the second terminal device, the second device driver being initialized during the initialization of the first device driver.

10. A computer-readable storage medium having a program embedded therein, the program defining, when executed by a computer, a method of installing a device driver for a system including a multifunction device having at least a first function and a second function, a first terminal device and at least one second terminal device, the multifunction device being connected to the first terminal device, the first terminal device and the second terminal device being connected through a network, the program being executed by said first terminal device and second terminal device, the method comprising the steps of:

- installing a first device driver for the first function and a second device driver for the second function in the first terminal device, the second driver being installed in the first terminal device as a part of the first device driver, the second function not being part of the first function;
- initializing the first driver installed in the first terminal device, the second device driver being initialized during the initialization of the first device driver;
- setting to connect the at least one second terminal device to the multifunction device through the first terminal device with respect to the first function;
- installing the first device driver from the first terminal device to the second terminal device, the second device driver being installed in the second terminal device as a part of the first device driver; and
- initializing the first device driver installed in the second terminal device, the second device driver being initialized during the initialization of the first device driver.

11. A computer-readable storage medium having a program embedded therein, the program containing a first device driver and a second device driver respectively for a first function and a second function executable by a multifunction device, the first device driver and the second device driver being installed in accordance with a method of installing a device driver for a system including the multifunction device, a first terminal device and at least one second terminal device, the multifunction device being connected to the first terminal device, the first terminal device and the second terminal device being connected through a network, wherein the method includes the steps of:
- installing a first device driver for the first function and a second device driver for the second function in the first terminal device, the second driver being installed in the first terminal device as a part of the first device driver;
- initializing the first driver installed in the first terminal device, the second device driver being initialized during the initialization of the first device driver, the second function not being part of the first function;
- setting to connect the at least one second terminal device to the multifunction device through the first terminal device with respect to the first function;
- installing the first device driver from the first terminal device to the second terminal device, the second device driver being installed in the second terminal device as a part of the first device driver; and
- initializing the first device driver installed in the second terminal device, the second device driver being initialized during the initialization of the first device driver.

12. A computer-readable storage medium having a program embedded therein, the program defining, when executed by a computer, a method of installing a device driver for a system including a multifunction device having at least a first function of one of a printer and a facsimile device and a second function other than the function of the printer and the facsimile device, a first terminal device installed with an operating system provided with a sharing function of the first function, the program being executed by said first terminal device and second terminal device, the method comprising the steps of:

- installing, as a part of a first device driver corresponding to the first function of the multifunction device, a second device driver corresponding to the second function in the first terminal device;
- initializing the first driver installed in the first terminal device, the second device driver being initialized during the initialization of the first device driver;
- performing a setting, in the first terminal device, related to the sharing function of the multifunction device with respect to the first function;
- setting to connect the second terminal device to the multifunction device through the first terminal device with respect to the first function in the second terminal device;
- installing, from the first terminal device to the second terminal device, the second device driver as a part of the first device driver installed in the first terminal device; and
- initializing the second device driver installed in the second terminal device by initializing the first device driver in the second terminal device.

13. A computer-readable storage medium having a program embedded therein, the program containing a first device driver and a second device driver respectively for a first function and a second function executable by a multifunction device, the first function being one of a printer and a facsimile device and the second function being a function other than the function of the printer and the facsimile device, the first device driver and the second device driver being installed in accordance with a method of installing a device driver for a system including the multifunction device, a first terminal device installed with an operating system provided with a sharing function of the first function, wherein the method includes the steps of:
- installing, as a part of a first device driver corresponding to the first function of the multifunction device, a second device driver corresponding to the second function in the first terminal device;
- initializing the first driver installed in the first terminal device, the second device driver being initialized during the initialization of the first device driver;
- performing a setting, in the first terminal device, related to the sharing function of the multifunction device with respect to the first function;
- setting to connect the second terminal device to the multifunction device through the first terminal device with respect to the first function in the second terminal device;
- installing, from the first terminal device to the second terminal device, the second device driver as a part of the first device driver installed in the first terminal device; and
- initializing the second device driver installed in the second terminal device by initializing the first device driver in the second terminal device.

14. A computer-readable storage medium having a program embedded therein, the program being executed by a computer to realize an initialization of a device driver for a system including a multifunction device having at least a first function and a second function different from the first function, and a terminal device to which a first device driver corresponding to the first function and a second device driver corresponding to the second function are installed, the program defining a procedure of initializing the first device driver, the second device driver being initialized during the initialization of the first driver.

15. The computer-readable storage medium according to claim 14,
wherein files for the first device driver and the second device driver are copied in a same folder that corresponds to the first device driver of an operation system of the terminal device, and
wherein the files for the second device driver are copied to an appropriate folder during the initialization of the first device driver.

16. The computer-readable storage medium according to claim 15, wherein the files for the second device driver are registered with a registry of the operation system of the terminal device.

17. A computer-readable storage product encoded with a program which is executed by a computer to realize an initialization of a device driver for a system including a multifunction device having at least a first function and a second function different from the first function, and a terminal device to which a first device driver corresponding to the first function and a second device driver corresponding to the second function are installed, the program defining a procedure of initializing the first device driver, the second device driver being initialized during the initialization of the first driver.

18. The computer-readable storage product encoded with a program according to claim 17,
wherein files for the first device driver and the second device driver are copied in a same folder that corresponds to the first device driver of an operation system of the terminal device, and
wherein the files for the second device driver are copied to an appropriate folder during the initialization of the first device driver.

19. The computer-readable storage product encoded with a program according to claim 18, wherein the files for the second device driver are registered with a registry of the operation system of the terminal device.

* * * * *